(12) United States Patent
Sue et al.

(10) Patent No.: US 11,983,475 B2
(45) Date of Patent: *May 14, 2024

(54) METHOD FOR MANUFACTURING A CELL HAVING PINS AND SEMICONDUCTOR DEVICE BASED ON SAME

(71) Applicant: TAIWAN SEMICONDUCTOR MANUFACTURING COMPANY, LTD., Hsinchu (TW)

(72) Inventors: Pin-Dai Sue, Hsinchu (TW); Po-Hsiang Huang, Hsinchu (TW); Fong-Yuan Chang, Hsinchu (TW); Chi-Yu Lu, Hsinchu (TW); Sheng-Hsiung Chen, Hsinchu (TW); Chin-Chou Liu, Hsinchu (TW); Lee-Chung Lu, Hsinchu (TW); Yen-Hung Lin, Hsinchu (TW); Li-Chun Tien, Hsinchu (TW); Yi-Kan Cheng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,411

(22) Filed: Feb. 7, 2023

(65) Prior Publication Data
US 2023/0195991 A1 Jun. 22, 2023

Related U.S. Application Data

(63) Continuation of application No. 17/339,162, filed on Jun. 4, 2021, now Pat. No. 11,574,107, which is a
(Continued)

(51) Int. Cl.
*G06F 30/00* (2020.01)
*G06F 30/373* (2020.01)
(Continued)

(52) U.S. Cl.
CPC .......... *G06F 30/392* (2020.01); *G06F 30/373* (2020.01); *G06F 30/394* (2020.01); *G06F 2111/20* (2020.01)

(58) Field of Classification Search
CPC .......... G06F 30/392; G06F 30/394373; G06F 30/398; G06F 2111/20; H01L 23/528; H01L 23/5283; H01L 27/0207
See application file for complete search history.

(56) References Cited

U.S. PATENT DOCUMENTS 4,766,476 A * 8/1988 Schallenberger ........................... H01L 27/11807
257/923
5,831,315 A * 11/1998 Kengeri ................. H10B 10/15
257/393

(Continued)

FOREIGN PATENT DOCUMENTS

AU 2013207719 A1 * 7/2014 ....... H01L 21/02521
CN 1870175 A * 11/2006 ........... G11C 11/412
(Continued)

OTHER PUBLICATIONS

Office Action dated Mar. 2, 2021 for corresponding case No. DE 10-2019-128571.2 (pp. 1-145 of part one and pp. 1-145 of part two).

*Primary Examiner* — Naum Levin
(74) *Attorney, Agent, or Firm* — Hauptman Ham, LLP

(57) ABSTRACT

A semiconductor device includes: M*1st conductors in a first layer of metallization (M*1st layer) and being aligned correspondingly along different corresponding ones of alpha tracks and representing corresponding inputs of a cell region in the semiconductor device; and M*2nd conductors in a second layer of metallization (M*2nd layer) aligned correspondingly along beta tracks, and the M*2nd conductors including at least one power grid (PG) segment and one or more of an output pin or a routing segment; and each of first
(Continued)

and second ones of the input pins having a length sufficient to accommodate at most two access points; each of the access points of the first and second input pins being aligned to a corresponding different one of first to fourth beta tracks; and the PG segment being aligned with one of the first to fourth beta tracks.

20 Claims, 17 Drawing Sheets

Related U.S. Application Data continuation of application No. 16/659,351, filed on Oct. 21, 2019, now Pat. No. 11,030,372.

(60) Provisional application No. 62/753,296, filed on Oct. 31, 2018.

(51) Int. Cl.
  G06F 30/392 (2020.01)
  G06F 30/394 (2020.01)
  G06F 111/20 (2020.01)

(56) References Cited

U.S. PATENT DOCUMENTS

| | | | |
|---|---|---|---|
| 6,501,138 B1 * | 12/2002 | Karasawa | H01L 27/0207 257/E27.099 |
| 6,539,533 B1 * | 3/2003 | Brown, III | G06F 30/39 716/135 |
| 6,559,508 B1 * | 5/2003 | Lin | H01L 27/0266 257/355 |
| 6,885,609 B2 * | 4/2005 | Lee | G11C 8/16 365/154 |
| 7,120,080 B2 * | 10/2006 | Lee | G11C 7/02 711/149 |
| 7,194,717 B2 | 3/2007 | Andreev et al. | |
| 7,222,322 B1 * | 5/2007 | Chyan | G06F 30/394 716/122 |
| 7,260,442 B2 | 8/2007 | Hwang et al. | |
| 7,471,545 B2 * | 12/2008 | Nii | H10B 10/00 365/230.09 |
| 7,500,211 B2 | 3/2009 | Komaki | |
| 8,063,414 B2 * | 11/2011 | Uchida | H03K 19/20 257/E21.632 |
| 8,269,204 B2 * | 9/2012 | Greene | H10N 70/026 438/102 |
| 8,629,204 B2 | 1/2014 | Basfar et al. | |
| 8,631,383 B2 * | 1/2014 | Wagner | G06F 30/39 716/138 |
| 8,786,019 B2 | 7/2014 | Wu et al. | |
| 8,839,175 B2 | 9/2014 | Smayling et al. | |
| 9,035,393 B2 | 5/2015 | Ma et al. | |
| 9,256,709 B2 | 2/2016 | Yu et al. | |
| 9,570,395 B1 * | 2/2017 | Sengupta | H01L 29/785 |
| 9,680,473 B1 | 6/2017 | Anderson et al. | |
| 9,711,208 B2 * | 7/2017 | Yokoyama | G11C 11/417 |
| 9,812,435 B2 | 11/2017 | Okagaki et al. | |
| 9,865,510 B2 | 1/2018 | Chen et al. | |
| 9,934,347 B2 * | 4/2018 | Seo | G06F 30/392 |
| 10,242,946 B2 | 3/2019 | Lin et al. | |
| 10,396,063 B2 * | 8/2019 | Chang | H01L 27/11807 |
| 10,503,859 B2 | 12/2019 | Pelloie | |
| 10,811,357 B2 * | 10/2020 | Lee | H01L 27/0207 |
| 11,030,372 B2 | 6/2021 | Sue et al. | |
| 11,081,484 B2 * | 8/2021 | Zhu | H01L 21/823828 |
| 11,093,684 B2 * | 8/2021 | Yang | G06F 30/394 |
| 11,094,594 B2 * | 8/2021 | Tsao | H01L 27/0924 |
| 11,288,432 B2 * | 3/2022 | Chen | G06F 30/30 |
| 11,574,107 B2 * | 2/2023 | Sue | G06F 30/398 |
| 2003/0079194 A1 | 4/2003 | Igarashi et al. | |
| 2004/0120209 A1 * | 6/2004 | Lee | G11C 8/16 365/185.05 |
| 2004/0151041 A1 * | 8/2004 | Lee | G11C 11/4125 257/E27.098 |
| 2005/0232053 A1 * | 10/2005 | Azuma | G11C 5/147 365/226 |
| 2007/0033562 A1 * | 2/2007 | Correale | G06F 30/39 257/773 |
| 2012/0192135 A1 | 7/2012 | Gullette | |
| 2013/0207199 A1 | 8/2013 | Becker et al. | |
| 2014/0040838 A1 | 2/2014 | Liu et al. | |
| 2015/0278429 A1 | 10/2015 | Chang | |
| 2015/0379188 A1 * | 12/2015 | Kahng | G06F 30/398 716/112 |
| 2016/0063163 A1 | 3/2016 | Moroz et al. | |
| 2017/0032073 A1 * | 2/2017 | Chen | G06F 30/394 |
| 2017/0169153 A1 | 6/2017 | Hwang et al. | |
| 2017/0294430 A1 | 10/2017 | Seo et al. | |
| 2018/0005704 A1 * | 1/2018 | Takaoka | G11C 17/16 |
| 2018/0183439 A1 | 6/2018 | Sahu et al. | |
| 2018/0294280 A1 | 10/2018 | Kim et al. | |
| 2019/0155979 A1 | 5/2019 | Schultz | |
| 2019/0267319 A1 | 8/2019 | Sharma et al. | |

FOREIGN PATENT DOCUMENTS

| | | | |
|---|---|---|---|
| DE | 102017130427 | | 6/2018 |
| JP | 3461443 B2 | * | 4/1998 |
| JP | 2004119897 A | * | 4/2004 |
| KR | 20140114424 | | 9/2014 |
| KR | 20170068311 | | 6/2017 |
| KR | 20180113137 | | 10/2018 |
| TW | 396379 B | * | 7/2000 |
| TW | 201327030 | | 7/2013 |
| TW | I767154 | | 6/2022 |
| WO | WO-2019012887 A1 | * | 1/2019 ............... G03F 1/36 |

* cited by examiner

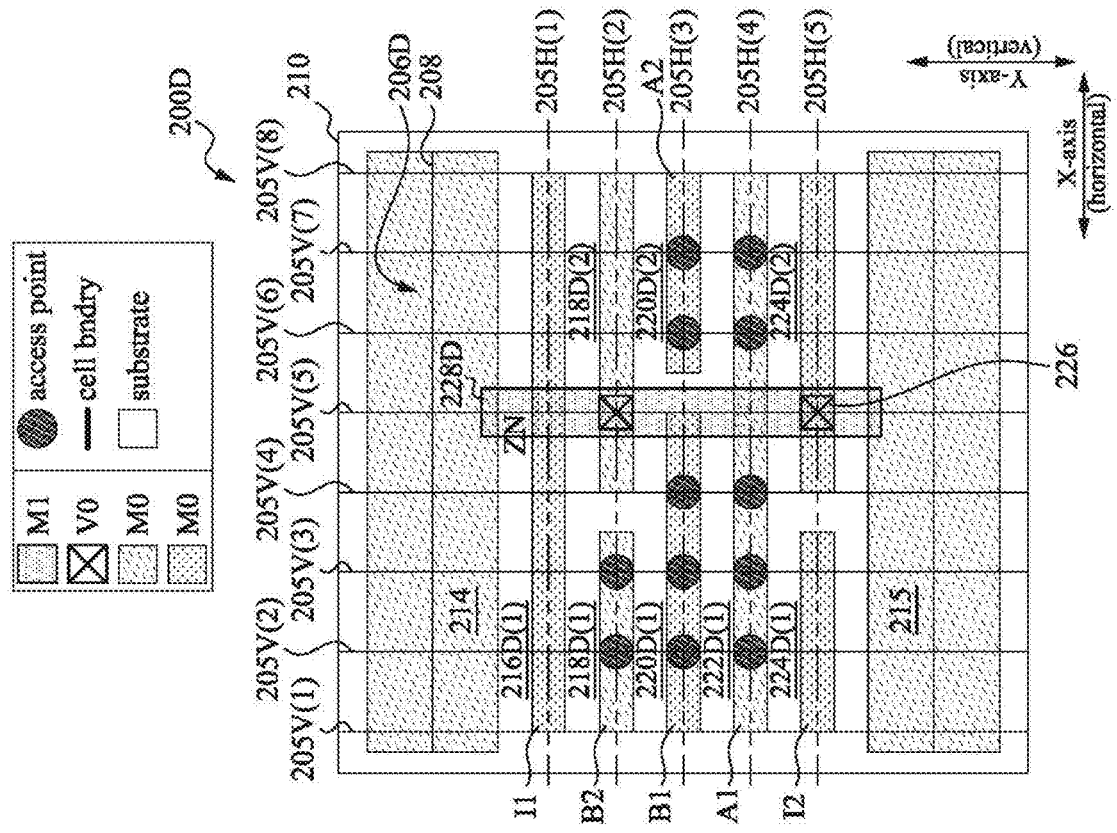
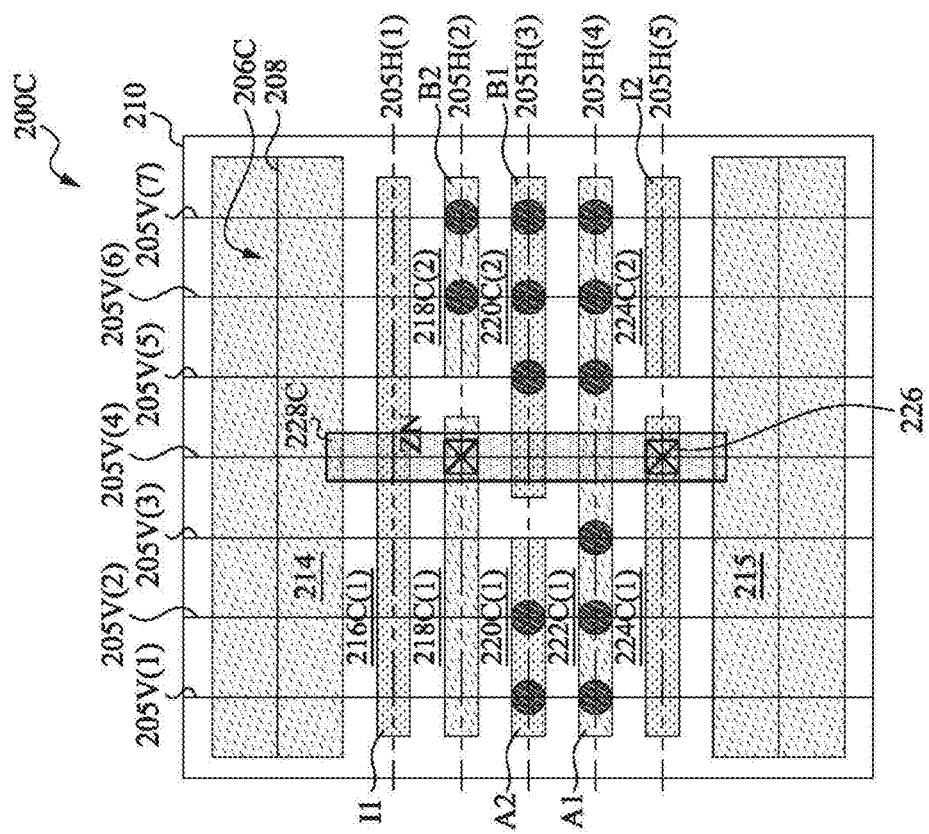
Fig. 2D
Fig. 2C

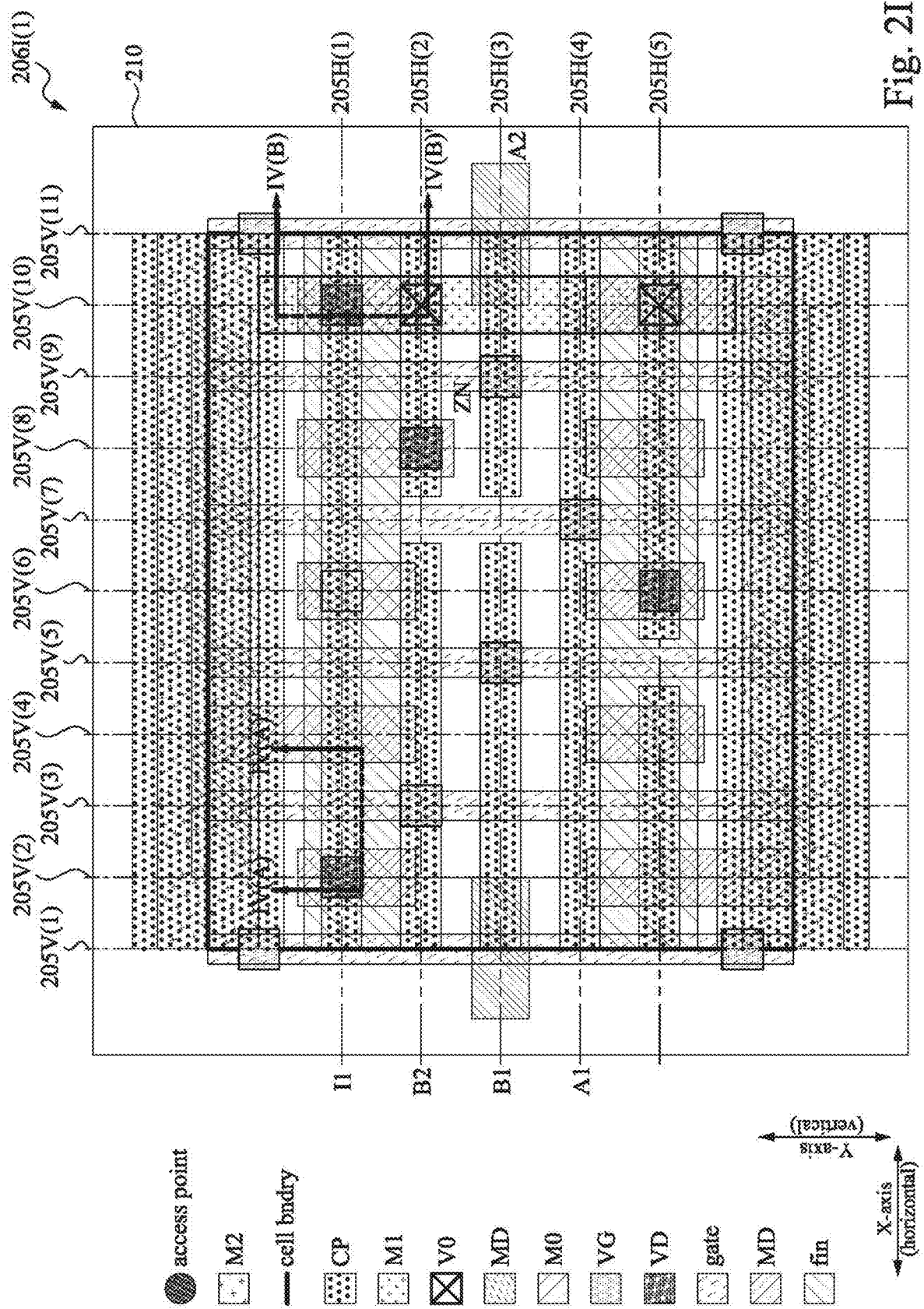

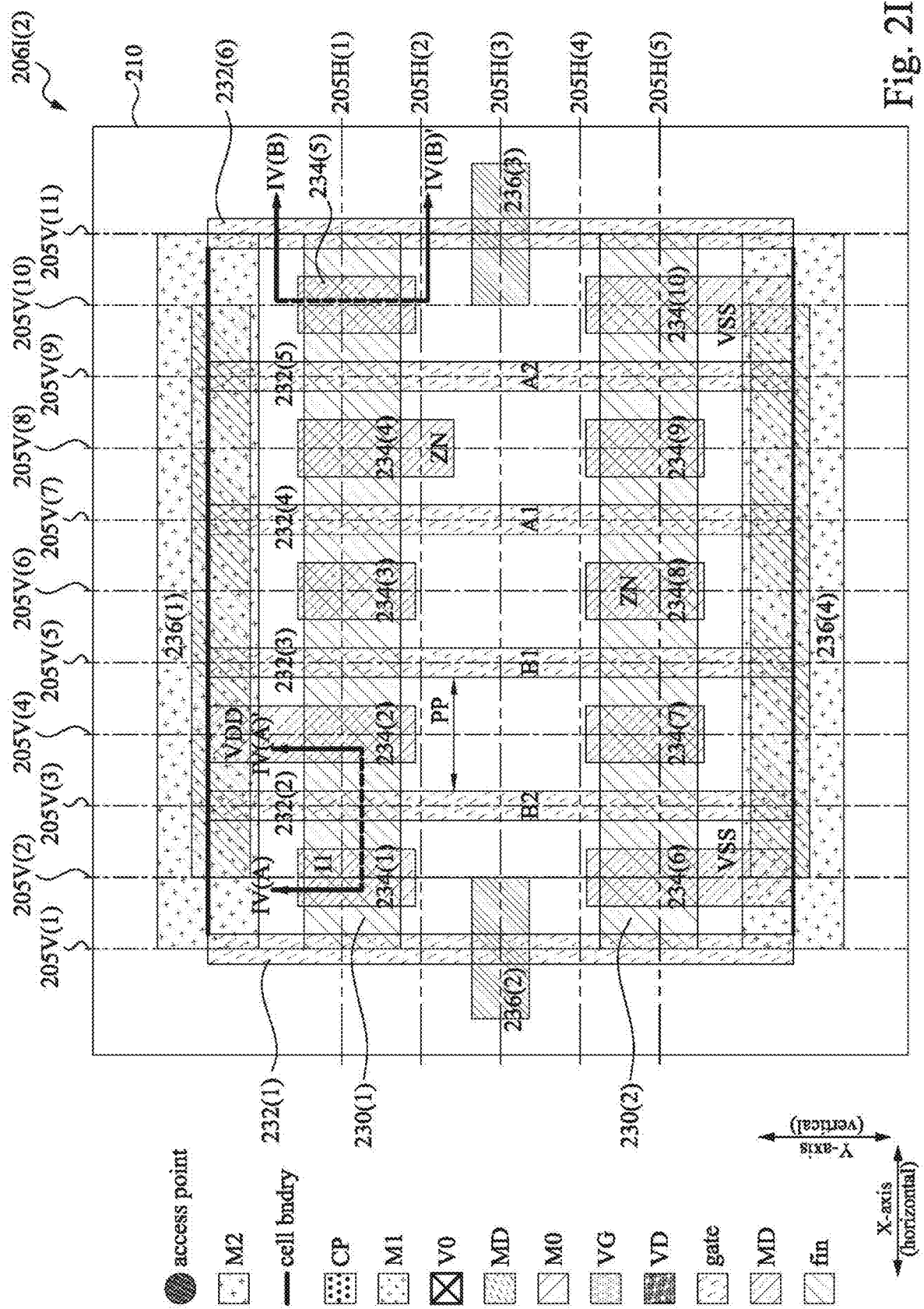
Fig. 2I(2)

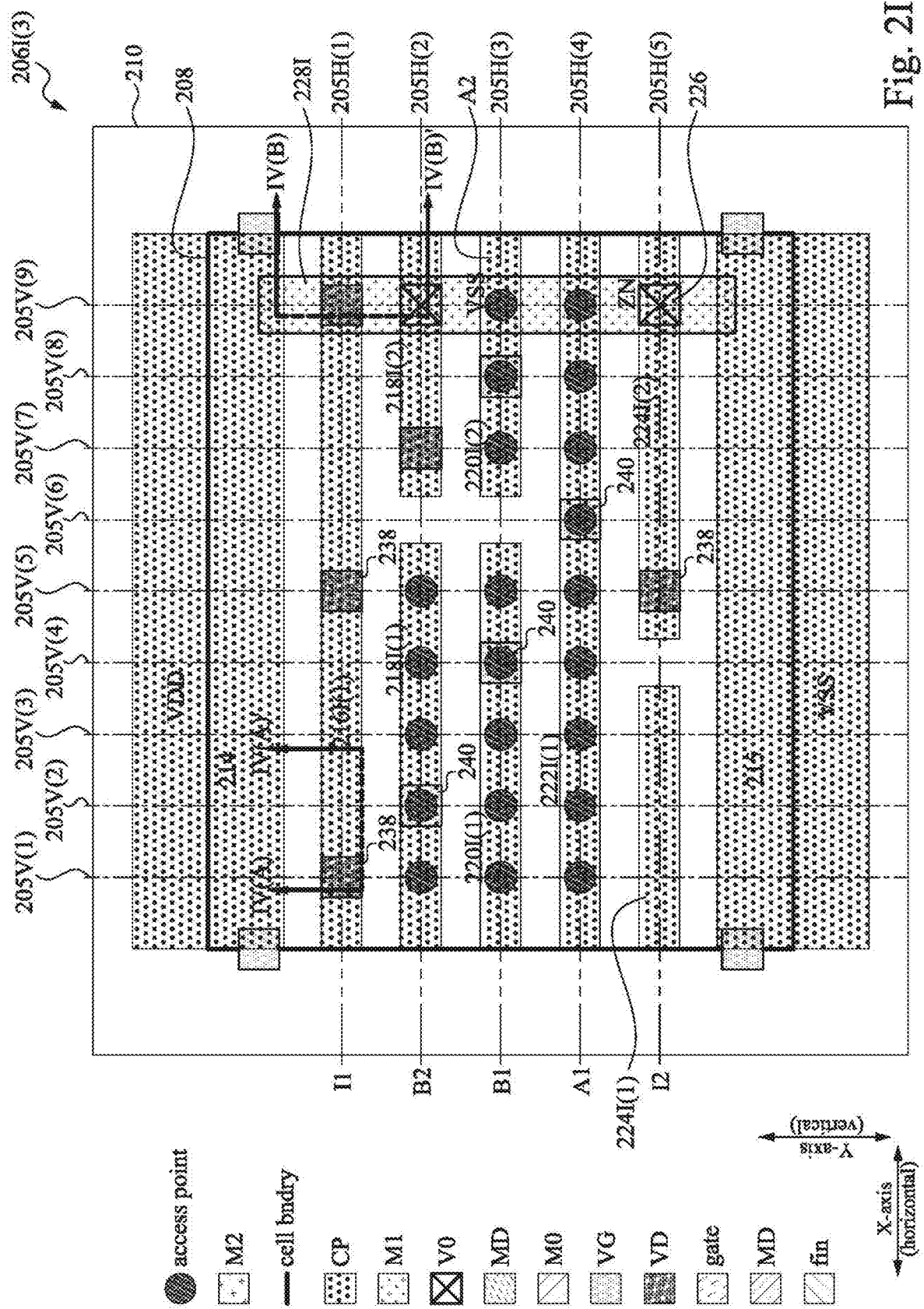
Fig. 2I(3)

628 arrange second to fifth pin patterns

632 co-track align two of second to fifth M0 pin patterns

Fig. 6B

626 generate second to fifth pin patterns

642 configure at each of second to fifth M0 pin patterns to have at least 2 access points

644 configure at least one of second to fifth M0 pin patterns to have at least: 3 access points; or 4 access points; or 5 access points; or 6 access points

Fig. 6C

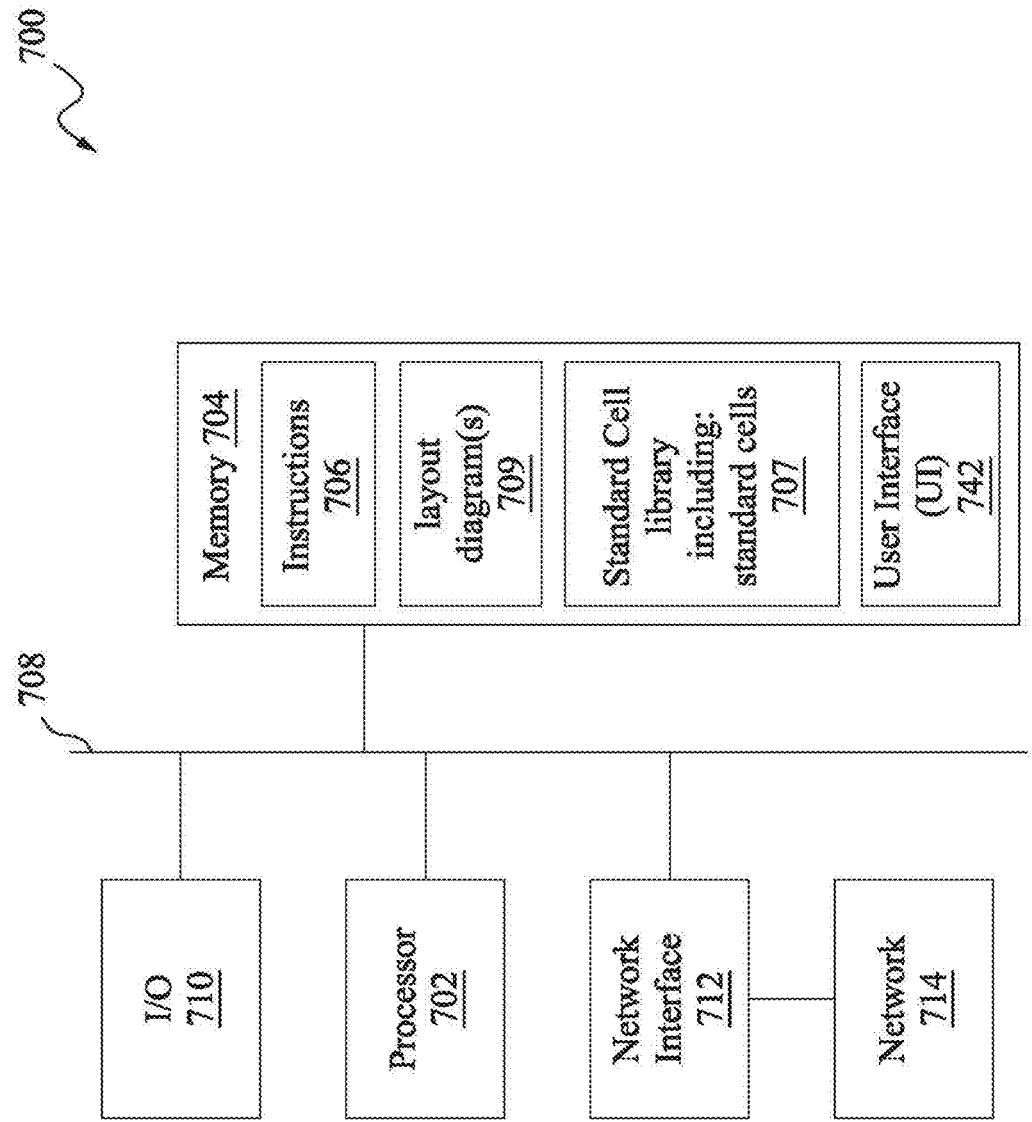

METHOD FOR MANUFACTURING A CELL HAVING PINS AND SEMICONDUCTOR DEVICE BASED ON SAME

PRIORITY CLAIM

The present application is a continuation of U.S. patent application Ser. No. 17/339,162, filed Jun. 4, 2021, now U.S. Pat. No. 11,574,107, issued Feb. 7, 2023, which is a continuation of U.S. patent application Ser. No. 16/659,351, filed Oct. 21, 2019, now U.S. Pat. No. 11,030,372, issued Jun. 8, 2021, that claims the priority of U.S. Provisional Application No. 62/753,296, filed Oct. 31, 2018, all of which are incorporated herein by reference in their entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process node by which will be fabricated a semiconductor device based on a layout diagram resulting. The design rule set compensates for variability of the corresponding process node. Such compensation increases the likelihood that an actual semiconductor device resulting from a layout diagram will be an acceptable counterpart to the virtual device on which the layout diagram is based.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIGS. 2A-2H and 2I(1)-2I(3) are corresponding layout diagrams of corresponding cells, in accordance with some embodiments.

FIGS. 6A-6G are corresponding flowcharts of corresponding methods of generating a layout diagram, in accordance with some embodiments.

FIG. 7 is a block diagram of an electronic design automation (EDA) system in accordance with some embodiments.

DETAILED DESCRIPTION

Figure 1:
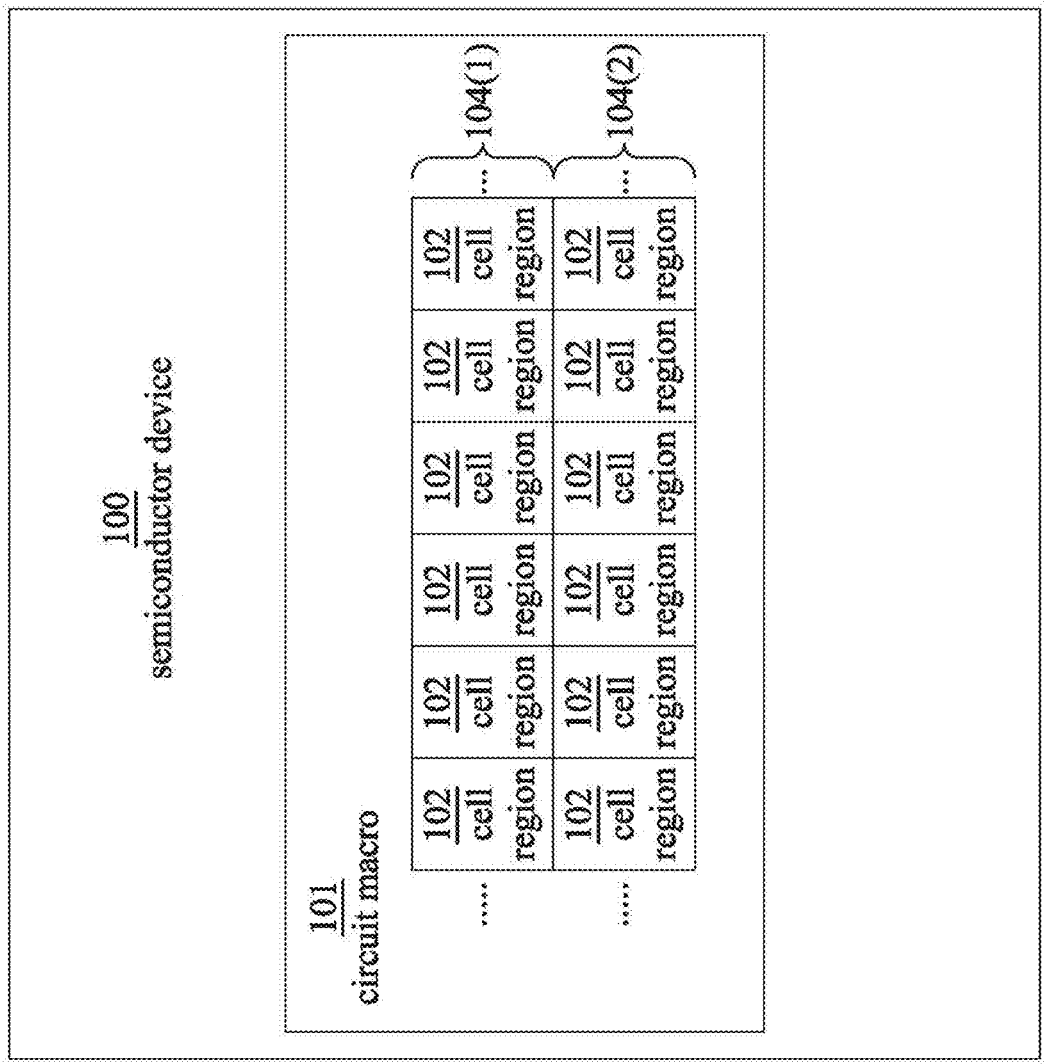
FIG. 1 is a block diagram of a semiconductor device in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a method of generating a layout diagram includes generating a cell having pin patterns concentrated in the M*1st level, e.g., M0, where the cell represents at least part of a first circuit in the semiconductor device, is arranged at least in part according to second tracks relative to the M*2nd level (M*2nd tracks), e.g., M1, which extend in a second direction (e.g., vertical), and first tracks relative to the M*1st level (M*1st tracks) which extend in a first direction (e.g., horizontal) substantially perpendicular to the second direction. The generating a cell includes: selecting, based on a chosen site for the cell in the layout diagram, one of the M*2nd tracks; generating a first pin pattern in the M*2nd level representing an output pin of the first circuit; arranging the first pin pattern substantially along the selected M*2nd track; generating second to fourth pin patterns in the M*1st level representing corresponding input pins of the first circuit; and arranging the second to fifth pin patterns substantially along corresponding ones of the M*1st tracks. According to another approach, a cell is generated which has a total of five pin patterns of which a majority (namely three) are located in the M*2nd level. By comparison, according to some embodiments, a cell is generated in which at least a majority of the pin patterns are concentrated in the M*1st level, which has benefits including one or more of improving routability at least by decreasing a number of wiring patterns in the M*2nd level which are designated as pin patterns, or improving flexibility at least by increasing by a number of points/locations at which connections potentially could be made (access points) to M*1st pin patterns, or the like. In some embodiments in which a cell has five pin patterns, four of the pin patterns are located in the M*1st level.

FIG. 1 is a block diagram of a semiconductor device 100 in accordance with at least one embodiment of the present disclosure.

Semiconductor device 100 includes, among other things, a circuit macro (hereinafter, macro) 101. In some embodiments, macro 101 is an SRAM macro. In some embodiments, macro 101 is a macro other than an SRAM macro. Macro 101 includes, among other things, one or more cell regions 102. Each cell region 102 has pins concentrated in the M*1st layer. Examples of layout diagrams having cells which result in cell region 102 include the layout diagrams disclosed herein.

Figure 2B:
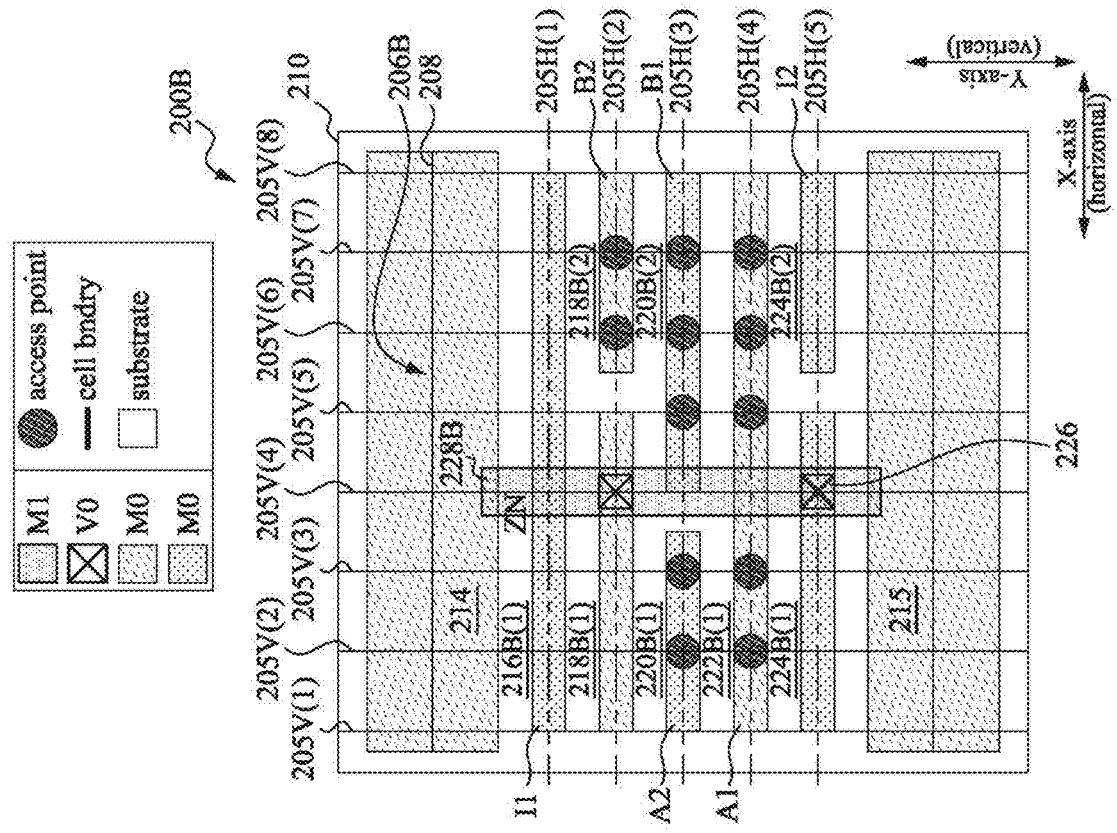
Figure 2A:
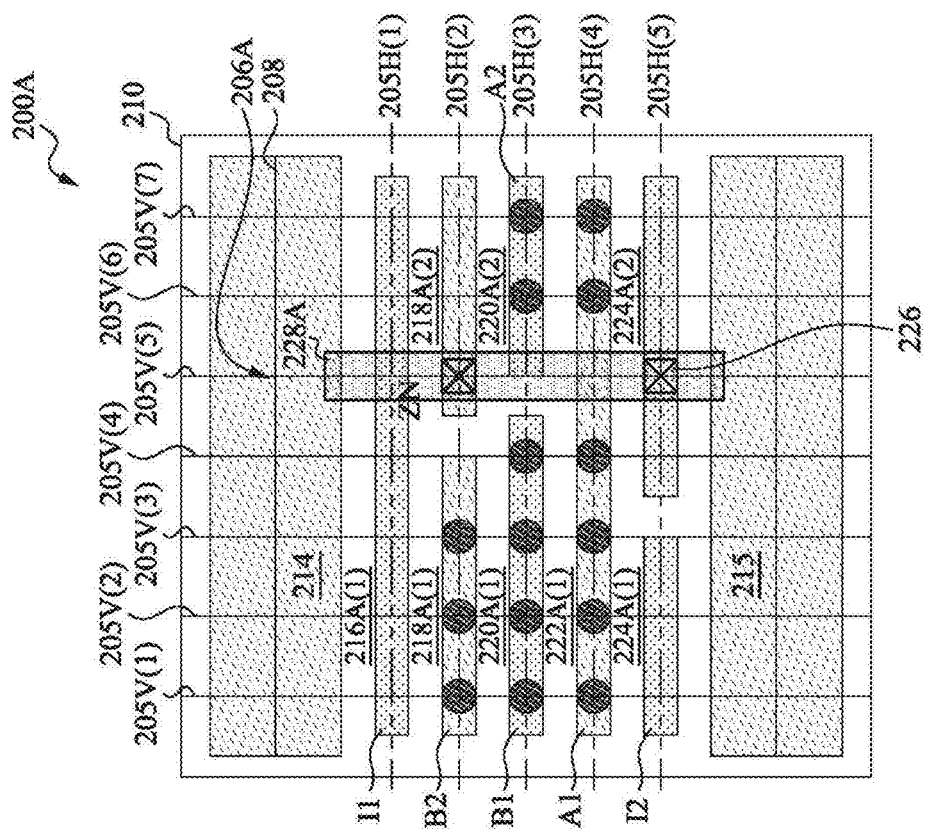

FIG. 2A is a layout diagram 200A of a cell 206A, in accordance with some embodiments.

In some embodiments, the function of cell 206A is a Boolean logic function. In some embodiments, the function of cell 206A is AND-OR-INVERT (AOI) (see FIGS. 2I(1)-2I(3)). In some embodiments, the function of cell 206A is OR-AND-INVERT (OAI). In some embodiments, the function of cell 206A is a Boolean logic function other than AOI or OAI. In some embodiments, the function of cell 206A is a storage function. An example of a semiconductor device having been fabricated based on a larger layout diagram which includes layout diagram 200A is semiconductor device 100 of FIG. 1, where one or more of cell regions 102 corresponds to cell 206A.

Cell 206A is arranged with respect to an imaginary first grid and an imaginary second grid. The first grid includes routing tracks 205H(1), 205H(2), 205H(3), 205H(4) and 205H(5) which extend substantially in a first direction. In some embodiments, the first direction is the horizontal direction. In some embodiments, the first direction is the X-axis. The second grid includes routing tracks 205V(1), 205V(2), 205V(3), 205V(4), 205V(5), 205V(6) and 205V(7) which extend substantially in a second direction substantially perpendicular to the first direction. In some embodiments, the second direction is the vertical direction. In some embodiments, the second direction is the Y-axis. Cell 206A has a perimeter 208 which includes side boundaries correspondingly on the top, right, bottom and left. Tracks 205H(1)-205H(5) have a first pitch relative to the Y-axis, and tracks 205V(1)-205V(7) have a second pitch relative to the X-axis, where the first and second pitches are determined by the design rules and scale of the corresponding semiconductor process technology node.

Cell 206A includes rectangular wiring patterns 214, 216A(1), 218A(1), 218A(2), 220A(1), 220A(2), 222A(1), 224A(1), 224A(2) and 215, long axes of which extend substantially parallel to the X-axis. Long axes of wiring patterns 216A(1), 218A(1), 218A(2), 220A(1), 220A(2), 222A(1), 224A(1) and 224A(2) are substantially aligned with corresponding tracks 205H(1), 205H(2), 205H(3), 205H(4). More particularly, the long axis of wiring pattern 216A(1) is substantially aligned with track 205H(1). The long axes of corresponding wiring patterns 218A(1) and 218A(2) are substantially aligned with track 205H(2). The long axes of corresponding wiring patterns 220A(1) and 220A(2) are substantially aligned with track 205H(3). The long axis of wiring pattern 222A(1) is substantially aligned with track 205H(4). The long axes of each of corresponding wiring patterns 224A(1) and 224A(2) are substantially aligned with track 205H(5).

Cell 206A further includes a rectangular wiring pattern 228A, and two instances of a via pattern 226. A long axis of wiring pattern 228A extends substantially parallel to the Y-axis. More particularly, the long axis of wiring pattern 228A is substantially aligned with track 205V(5). The two instances of via pattern 226 are located at the intersections of track 205V(5) and corresponding tracks 205H(2) and 205H(5).

Wiring patterns 214, 216A(1), 218A(1), 218A(2), 220A(1), 220A(2), 222A(1), 224A(1), 224A(2) and 215 correspond to conductors included in a first layer of metallization, M*1st, in a semiconductor device having been fabricated based on a larger layout diagram which includes layout diagram 200A. Wiring pattern 228A corresponds to a conductor in a second layer of metallization, M*2nd, in the semiconductor device having been fabricated based on a larger layout diagram which includes layout diagram 200A. Via patterns 226 correspond to via structures in a first level of interconnect structures (first level of interconnection), V*1st, between the M*1st and M*2nd layers, in the semiconductor device having been fabricated based on a larger layout diagram which includes layout diagram 200A. In some embodiments, depending upon the numbering convention of the corresponding process node by which such a semiconductor device is fabricated, the first (1st) layer of metallization M*1st is either metallization layer zero, M0, or metallization layer one, M1, and correspondingly the first layer of interconnection V*1st is either VIA0 or VIA1. In FIGS. 2A-2H and 2I(1)-2I(3), M*1st is assumed to be M0 and V*1st is assumed to be VIA0 such that via patterns 226 in level VIA0 are referred to as V0 patterns 226. In some embodiments, M0 is the first layer of metallization above a transistor layer (see FIGS. 4A-4B, discussed below) in which transistors are formed.

It is assumed that the process node, by which is fabricated a semiconductor device based on a larger layout diagram which includes layout diagram 200A, uses multi-patterning, e.g., double-patterning, lithography. Accordingly, wiring patterns 214, 218A(1), 218A(2), 222A(1), 224A(1) and 215, are shown in the color red, whereas wiring patterns 216A(1), 220A(1), 220A(2), 224A(1) and 224A(2) are shown in the color green.

Further continuing the example of FIG. 2A, relative to the horizontal direction, M1 wiring pattern 228A partially overlaps an end of M0 wiring pattern 220A(2), and fully overlaps corresponding portions of M0 wiring patterns 216A(1), 218A(2), 222A(1) and 224A(2). In some embodiments, full overlap (relative to the horizontal direction) by a given wiring pattern in the M1 layer (hereinafter, the given M1 pattern) over a corresponding given wiring pattern in the M0 layer (hereinafter, the given M0 pattern), plus extension (relative to the horizontal direction) of the given M0 pattern a predetermined distance beyond each of first and second sides of the given M1 pattern, is regarded as a sufficient amount of overlap for purposes of making a via-based connection between the given M0 pattern and the corresponding given M1 pattern. Accordingly, here, it is assumed that the partial overlap of M0 wiring pattern 220A(2) by M1 wiring pattern 228A is insufficient for interposing a via pattern therebetween. However, it is also assumed that the full overlap of corresponding portions of M0 wiring patterns 216A(1), 218A(2), 222A(1) and 224A(2) would be sufficient for purposes of making corresponding via-based connections therebetween, if so desired. In the example of FIG. 2A, it is further assumed that via-based connections are to be made between M1 wiring pattern 228A and corresponding M0 wiring patterns 218A(2) and 224A(2).

In some embodiments, cell 206A includes patterns in a corresponding transistor level (not shown). In some embodiments, the transistor level of cell 206A includes corresponding sub-levels (not shown). The sub-levels include component patterns (not shown) corresponding to components, e.g., transistors, of a circuit that would result from a larger layout diagram which includes layout diagram 200A.

In some embodiments, the transistor level of cell 206A is designated for CMOS configuration such that a semiconductor device having been fabricated based on a layout diagram which includes cell 206A would be a CMOS device. Where designated for CMOS configuration, cell 206A is organized into a first area (not shown) designated for PMOS-configuration and a second area (not shown) designated for NMOS-configuration. Details regarding CMOS configuration and corresponding fabrication are found, e.g., in U.S. Pat. No. 8,786,019, granted Jul. 22, 2014, the entirety of each of which is hereby incorporated by reference. In some embodiments, the transistor level of cell 206A is designated for PMOS configuration and not for CMOS configuration. In some embodiments, the transistor layer of cell 206A is designated for NMOS configuration and not for CMOS configuration.

In FIG. 2A, wiring patterns 214 and 215 are power grid (PG) patterns which represent portions of longer corresponding power grid lines of a semiconductor device which has been fabricated based on layout diagram 200A. In some embodiments, PG pattern 214 is designated for a first reference voltage and PG pattern 215 is designated for a second reference voltage. In some embodiments, the first reference voltage is VDD and the second reference voltage is VSS.

As an example, in FIG. 2A, in order to achieve (at least in part) the function which cell 206A represents, it is assumed that each of wiring patterns 216A(1) and 224A(1) should be an intra-cell wiring pattern and are correspondingly labeled I1 and I2. In some embodiments, intra-cell wiring patterns 216A(1) and 224A(1) represent conductors in a corresponding cell region of a semiconductor device which has been fabricated based on a larger layout diagram which includes layout diagram 200A. In some embodiments, an intra-cell wiring pattern represents an intra-cell conductor in a corresponding cell region in a semiconductor device having been fabricated based on a larger layout diagram which includes layout diagram 200A, wherein the intra-cell conductor carries a signal which is internal to the function of the corresponding cell region. An intra-cell conductor is different than a pin. A pin is a type of conductor which carries an input/output (I/O) signal of the function of the corresponding cell region.

More particularly as to the example of FIG. 2A, absent some reason to the contrary, e.g., a routing conflict, a first design rule sets a default length of intra-cell wiring patterns (e.g., pattern 216A(1)) to a maximum intra-cell length in the horizontal direction so that a semiconductor device which has been fabricated based on the corresponding layout diagram (e.g., layout diagram 200A) exhibits correspondingly increased structural density. Such a semiconductor device can be planarized more quickly, e.g., because the increased structural density reduces irregularities in surface topography. In some embodiments, the maximum length (LMAX) is substantially equal to the difference between a width of the cell (LW) and twice the minimum boundary offset (LOFF) with respect to a left/right side boundary of a cell such that LMAX≈L−2*LOFF. The minimum boundary offset LOFF is determined by the design rules and scale of the corresponding semiconductor process technology node.

Continuing the example of FIG. 2A, in order to achieve (at least in part) the function which cell 206A represents, it is assumed that M0 wiring patterns 218A(1), 220A(1), 220A(2) and 222A(1) represent corresponding inputs B2, B1, A2 and A1, and that M1 wiring pattern 228A represents output ZN. As such, M0 wiring patterns 218A(1), 220A(1), 220A(2) and 222A(1) are input pin patterns, and M1 wiring pattern 228A is an output pin pattern which represent corresponding input pins and an output pin in a corresponding cell region of a semiconductor device having been fabricated based on a larger layout diagram which includes layout diagram 200A. Again, a pin is a type of conductor which carries an input/output (I/O) signal of the function of the corresponding cell region. A pin is different than an intra-cell conductor, as explained above. Accordingly, a benefit is that cell 206A represents a cell in which at least a majority of the pin patterns are concentrated in the M0 level. More particularly, cell 206A has five pin patterns, four of which are located in the M0 level, namely M0 pin patterns 218A(1), 220A(1), 220A(2) and 222A(1). Another benefit of cell 206A is that M0 pin patterns 218A(1), 220A(1), 220A(2) and 222A(1) are arranged substantially along three or fewer corresponding ones of the M0 tracks, namely tracks 205H(2), 205H(3) and 205H(4).

Pin patterns 218A(1), 220A(1), 222A(1), as well as intra-cell wiring pattern 224A(1), extend in the horizontal direction towards the left side boundary of cell 206A. Gaps between the left side boundary of cell 206A and corresponding ends of pin patterns 218A(1), 220A(1), 222A(1), as well as intra-cell wiring pattern 224A(1), represent the minimum boundary offset (LOFF) with respect to a left/right side boundary of a cell. In some embodiments, one or more of pin patterns 218A(1), 220A(1), 222A(1) extend across the left side boundary of cell 206A. Pin patterns 220A(2) and 222A)(1), as well as M0 wiring patterns 218A(2) and 224A(2), extend in the horizontal direction towards the right side boundary of cell 206A. Gaps between the right side boundary of cell 206A and corresponding ends of pin patterns 220A(2) and 222A(1), as well as M0 wiring patterns 218A(2) and 224A(2), represent the minimum boundary offset (LOFF) with respect to a left/right side boundary of a cell. In some embodiments, one or more of pin patterns 220A(2) and 222A)(1) extend across the right side boundary of cell 206A.

In some embodiments, two wiring patterns are considered to be substantially co-track if the two wiring patterns are substantially aligned with the same track. Where there are wiring patterns which are substantially co-track, a second design rule for the process node associated with the cell imposes (relative to the X-axis) a minimum gap (end-to-end gap) between ends of substantially co-track aligned wiring patterns. In layout diagram 200A, examples of substantially co-track aligned wiring patterns include pin pattern 218A(1) and wiring pattern 218A(2) substantially aligned with track 205H(2), pin pattern 220A(1) and pin pattern 220A(2) substantially aligned with track 205H(3), wiring pattern 224A(1) and 224A(2) substantially aligned with track 205H(5). For substantially co-track pin pattern 218A(1) and wiring pattern 218A(2), the gap therebetween is located at the intersection of tracks 205H(2) and 205V(4). For substantially co-track pin pattern 220A(1) and pin pattern 220A(2), the gap therebetween is located between the intersections of track 205H(3) with tracks 205V(4) and 205V(5). For substantially co-track wiring pattern 224A(1) and 224A(2), the gap therebetween is located between the intersections of track 205H(5) with tracks 205V(3) and 205V(4). The minimum gap end-to-end gap is determined by the design rules and scale of the corresponding semiconductor process technology node.

Continuing the example of FIG. 2A, the following is further assumed: none of M0 pin patterns 218A(1), 220A(1) nor 220A(2) has an overlying M1 routing conflict; and M0 pin pattern 222A(1) has one overlying M1 routing conflict at track 205V(5) to which M1 pin pattern 228A is substantially aligned. Relative to the X-axis, at a given position along an M0 pin pattern, if there is no overlying M1 routing conflict, then there is the potential for accessing the M0 pin pattern at the given position. Accordingly, the given position is referred to as an access point. Layout diagram 200A shows access points at the following intersections: three access points where pin pattern 218A(1) intersects tracks 205V(1), 205V(2) and 205V(3); four access points where pin pattern 220A(1) intersects tracks 205V(1), 205V(2), 205V(3) and 205V(4); two access points where pin pattern 220A(2) intersects tracks 205V(6) and 205V(7); and six access points where pin pattern 222A(1) intersects tracks 205V(1), 205V(2), 205V(3), 205V(4), 205V(6) and 205V(7).

Cell 206A exhibits increased numbers of access points in the M0 level resulting from having concentrated at least a majority of the pin patterns in the M0 level. Accordingly, another benefit of cell 206A is improved flexibility resulting from the increased numbers of access points in the M0 level. By conserving the increased numbers of access points in the M0 level until a function for cell 206A is chosen, the improved flexibility of cell 206A is correspondingly preserved. After a function for cell 206A has been chosen, for each of M0 pin patterns 218A(1), 220A(1), 220A(2) and 222A(1), one of the corresponding access points is selected to be a via-based connection to an overlying metallization level, e.g., level M1, based on the chosen function.

Consideration is now given to a circumstance referred to as a 'stacked 2AP pattern' circumstance. In layout diagram 200A, relative to the X-axis, pin pattern 220A(2) has a length which is sufficient to accommodate only two access points, namely at the intersections with corresponding tracks 205V(6) and 205V(7), such that pin pattern 220A(2) also is referred to as a two access-point (2AP) pattern. Recalling that the two access points of pin pattern 220A(2) are located at the intersections of pin pattern 220A(2) and corresponding tracks 205V(6) and 205V(7), if another 2AP wiring pattern were to be substantially aligned with one of tracks 205H(2) or 205H(4) so that the two access points of the other 2AP wiring pattern were also located at the intersections of corresponding tracks 205V(6) and 205V(7), then a circumstance would arise which is referred to as the 'stacked 2AP pattern' circumstance. In such a circumstance, if one of the access points of pin pattern 220A(2) was to be used for a via-based connection to a corresponding M1 wiring pattern substantially aligned with, e.g., track 205V(7), then the access point in the other 2AP pattern at the intersection of track 205V(7) would no longer be available for a potential connection to an M1 wiring pattern, however the access point in the other 2AP pattern at the intersection with track 205V(6) would still be available for a potential connection to an M1 wiring pattern.

The stacked 2AP pattern circumstance becomes a stacked 2AP pattern problem in a scenario in which the M1 wiring pattern substantially aligned with track 205V(7) is an M1 PG pattern. A PG pattern is wider than a routing pattern relative to the X-axis. According to a third design rule, if an M1 PG pattern is substantially aligned with an M1 track, e.g., track 205V(7), then no M1 conductive pattern is permitted in the left-adjacent M1 track or right-adjacent M1 track because otherwise the M1 conductive pattern would be separated (relative to the X-axis) from the M1 PG pattern by less a permissible separation distance. The minimum separation distance is determined by the design rules and scale of the corresponding semiconductor process technology node. Because the third design rule prevents a via-based connection between the access point of the other 2AP pattern at the intersection with track 205V(6), and because the access point of the intersection with track 205V(7) is unavailable due to the M1 PG pattern substantially aligned with track 205V(7), the other 2AP pattern is precluded from having any via-based connections to an M1 wiring pattern, which is a problem because no via-based connections can be made to an M1 wiring pattern.

Regarding cell 206A, another benefit is that the arrangement of M0 pin patterns 218A(1), 220A(1), 220A(2) and 222A(1) avoids the stacked 2AP pattern circumstance (discussed above). As such, a further benefit is that the arrangement of M0 pin patterns 218A(1), 220A(1), 220A(2) and 222A(1) in cell 206A thereby prevents the stacked 2AP pattern problem (discussed above).

FIG. 2B is a layout diagram 200B of a cell 206B, in accordance with some embodiments.

Layout diagram 200B is similar to layout diagram 200A. FIG. 2B follows a similar numbering convention to that of FIG. 2A. Though corresponding, some components also differ. To help identify components which correspond but nevertheless have differences, the numbering convention uses an alphabetic character. For example, pattern 216B(1) in FIG. 2B and pattern 216A(1) in FIG. 2A are both wiring patterns, with similarities being reflected in the common root 216* and the common parenthetical **(1), and with the differences being reflected in the alphabetic characters *B(*) and ***A(*). For brevity, the discussion will focus more on differences between FIG. 2B and FIG. 2A than on similarities.

For the example of FIG. 2B, in order to achieve (at least in part) the function which cell 206B represents, the following is assumed: M0 wiring patterns 218B(2), 220B(1), 220B(2) and 222B(1) represent corresponding inputs B2, A2, B1 and A1; M1 wiring pattern 228B represents output ZN; and wiring patterns 216B(1) and 224B(2) are intra-cell wiring patterns correspondingly labeled I1 and I2. Cell 206B includes an extra M1 routing track, namely 205V(8), as compared to cell 206A of FIG. 2A.

In layout diagram 200B, the long axis of M1 wiring pattern 228B is substantially aligned with track 205V(4), whereas the long axis of M1 wiring pattern 228A is substantially aligned with track 205V(5) in FIG. 2A. Two instances of V0 pattern 226 are located at the intersections of track 205V(4) and corresponding tracks 205H(2) and 205H(5).

For substantially co-track wiring pattern 218B(1) and pin pattern 218B(2), the gap therebetween is located between the intersections of track 205H(2) with tracks 205V(5) and 205V(6). For substantially co-track pin pattern 220B(1) and pin pattern 220B(2), the gap therebetween is located between the intersections of track 205H(3) with tracks 205V(3) and 205V(4). For substantially co-track wiring pattern 224B(1) and 224B(2), the gap therebetween is located between the intersections of track 205H(5) with tracks 205V(5) and 205V(6).

In FIG. 2B, a benefit is that cell 206B represents a cell in which at least a majority of the pin patterns are concentrated in the M0 level. More particularly, cell 206B has five pin patterns, four of which are located in the M0 level, namely M0 pin patterns 218B(2), 220B(1), 220B(2) and 222B(1). Another benefit of cell 206B is that M0 pin patterns 218B(2), 220B(1), 220B(2) and 222B(1) are arranged substantially along three or fewer corresponding ones of the M0 tracks, namely tracks 205H(2), 205H(3) and 205H(4). Another benefit of cell 206B is improved flexibility resulting from the increased numbers of access points in the M0 level. By conserving the increased numbers of access points in the M0 level until a function for cell 206B is chosen, the improved flexibility of cell 206B is correspondingly preserved.

Regarding cell 206B, another benefit is that the arrangement of M0 pin patterns 218B(2), 220B(1), 220B(2) and 222B(1) avoids the stacked 2AP pattern circumstance (discussed above). As such, a further benefit is that the arrangement of M0 pin patterns 218B(2), 220B(1), 220B(2) and 222B(1) in cell 206B thereby prevents the stacked 2AP pattern problem (discussed above).

FIG. 2C is a layout diagram 200C of a cell 206C, in accordance with some embodiments.

Layout diagram 200C is similar to layout diagram 200A. FIG. 2C follows a similar numbering convention to that of FIG. 2A. Though corresponding, some components also differ. To help identify components which correspond but nevertheless have differences, the numbering convention uses an alphabetic character. For example, pattern 216C(1) in FIG. 2C and pattern 216A(1) in FIG. 2A are both wiring patterns, with similarities being reflected in the common root 216* and the common parenthetical **(1), and with the differences being reflected in the alphabetic characters *C(*) and ***A(*). For brevity, the discussion will focus more on differences between FIG. 2C and FIG. 2A than on similarities.

For the example of FIG. 2C, in order to achieve (at least in part) the function which cell 206C represents, the following is assumed: M0 wiring patterns 218C(2), 220C(1), 220C(2) and 222C(1) represent corresponding inputs B2, A2, B1 and A1; M1 wiring pattern 228C represents output ZN; and wiring patterns 216C(1) and 224C(2) are intra-cell wiring patterns correspondingly labeled I1 and I2.

In layout diagram 200C, the long axis of M1 wiring pattern 228C is substantially aligned with track 205V(4), whereas the long axis of M1 wiring pattern 228A is substantially aligned with track 205V(5) in FIG. 2A. Two instances of V0 pattern 226 are located at the intersections of track 205V(4) and corresponding tracks 205H(2) and 205H(5).

For substantially co-track wiring pattern 218C(1) and pin pattern 218C(2), the gap therebetween is located between the intersections of track 205H(2) with tracks 205V(4) and 205V(5). For substantially co-track pin pattern 220C(1) and pin pattern 220C(2), the gap therebetween is located between the intersections of track 205H(3) with tracks 205V(3) and 205V(4). For substantially co-track wiring pattern 224C(1) and 224C(2), the gap therebetween is located between the intersections of track 205H(5) with tracks 205V(4) and 205V(5).

In FIG. 2C, a benefit is that cell 206C represents a cell in which at least a majority of the pin patterns are concentrated in the M0 level. More particularly, cell 206C has five pin patterns, four of which are located in the M0 level, namely M0 pin patterns 218C(2), 220C(1), 220C(2) and 222C(1). Another benefit of cell 206C is that M0 pin patterns 218C(2), 220C(1), 220C(2) and 222C(1) are arranged substantially along three or fewer corresponding ones of the M0 tracks, namely tracks 205H(2), 205H(3) and 205H(4). Another benefit of cell 206C is improved flexibility resulting from the increased numbers of access points in the M0 level. By conserving the increased numbers of access points in the M0 level until a function for cell 206C is chosen, the improved flexibility of cell 206C is correspondingly preserved.

Regarding cell 206C, another benefit is that the arrangement of M0 pin patterns 218C(2), 220C(1), 220C(2) and 222C(1) avoids the stacked 2AP pattern circumstance (discussed above). As such, a further benefit is that the arrangement of M0 pin patterns 218C(2), 220C(1), 220C(2) and 222C(1) in cell 206C thereby prevents the stacked 2AP pattern problem (discussed above).

FIG. 2D is a layout diagram 200D of a cell 206D, in accordance with some embodiments.

Layout diagram 200D is similar to layout diagram 200A. FIG. 2D follows a similar numbering convention to that of FIG. 2A. Though corresponding, some components also differ. To help identify components which correspond but nevertheless have differences, the numbering convention uses an alphabetic character. For example, pattern 216D(1) in FIG. 2D and pattern 216A(1) in FIG. 2A are both wiring patterns, with similarities being reflected in the common root 216* and the common parenthetical **(1), and with the differences being reflected in the alphabetic characters *D(*) and ***A(*). For brevity, the discussion will focus more on differences between FIG. 2D and FIG. 2A than on similarities.

For the example of FIG. 2D, in order to achieve (at least in part) the function which cell 206D represents, the following is assumed: M0 wiring patterns 218D(1), 220D(1), 220D(2) and 222D(1) represent corresponding inputs B2, B1, A2 and A1; M1 wiring pattern 228D represents output ZN; and wiring patterns 216D(1) and 224D(1) are intra-cell wiring patterns correspondingly labeled I1 and I2. Cell 206D includes an extra M1 routing track, namely 205V(8), as compared to cell 206A of FIG. 2A.

In layout diagram 200D, the long axis of M1 wiring pattern 228D is substantially aligned with track 205V(5), which is the same as in FIG. 2A wherein the long axis of M1 wiring pattern 228A is substantially aligned with track 205V(5). Two instances of V0 pattern 226 are located at the intersections of track 205V(5) and corresponding tracks 205H(2) and 205H(5).

For substantially co-track pin pattern 218D(1) and wiring pattern 218D(2), the gap therebetween is located between the intersections of track 205H(2) with tracks 205V(3) and 205V(4). For substantially co-track pin pattern 220D(1) and pin pattern 220D(2), the gap therebetween is located between the intersections of track 205H(3) with tracks 205V(5) and 205V(6). For substantially co-track wiring pattern 224D(1) and 224D(2), the gap therebetween is located between the intersections of track 205H(5) with tracks 205V(3) and 205V(4).

In FIG. 2D, a benefit is that cell 206D represents a cell in which at least a majority of the pin patterns are concentrated in the M0 level. More particularly, cell 206D has five pin patterns, four of which are located in the M0 level, namely M0 pin patterns 218D(1), 220D(1), 220D(2) and 222D(1). Another benefit of cell 206D is that M0 pin patterns 218D(1), 220D(1), 220D(2) and 222D(1) are arranged substantially along three or fewer corresponding ones of the M0 tracks, namely tracks 205H(2), 205H(3) and 205H(4). Another benefit of cell 206D is improved flexibility resulting from the increased numbers of access points in the M0 level. By conserving the increased numbers of access points in the M0 level until a function for cell 206D is chosen, the improved flexibility of cell 206D is correspondingly preserved.

Regarding cell 206D, another benefit is that the arrangement of M0 pin patterns 218D(1), 220D(1), 220D(2) and 222D(1) avoids the stacked 2AP pattern circumstance (discussed above). As such, a further benefit is that the arrangement of M0 pin patterns 218D(1), 220D(1), 220D(2) and 222D(1) in cell 206D thereby prevents the stacked 2AP pattern problem (discussed above).

Figures 2E, 2F:
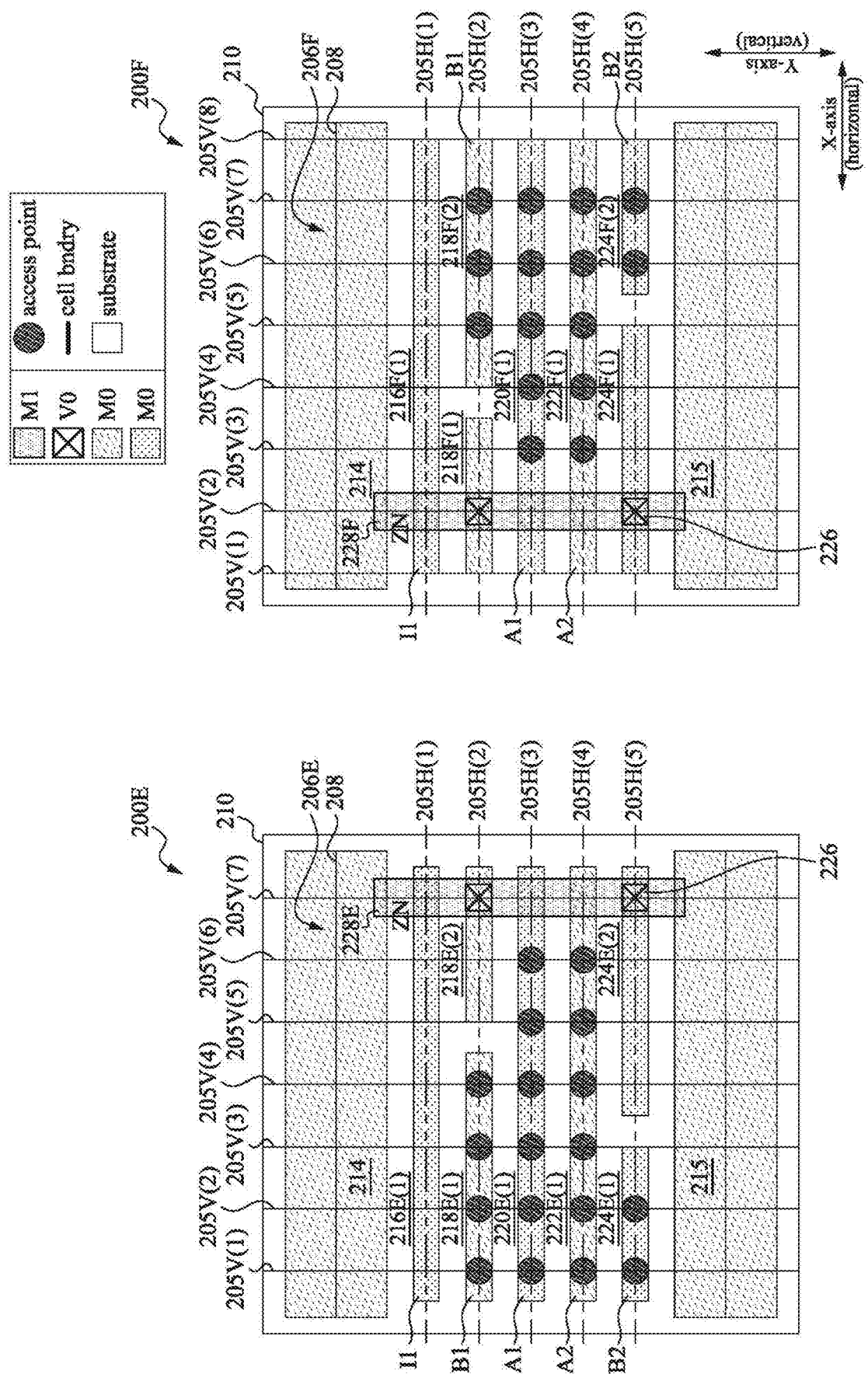

FIG. 2E is a layout diagram 200E of a cell 206E, in accordance with some embodiments.

Layout diagram 200E is similar to layout diagram 200A. FIG. 2E follows a similar numbering convention to that of FIG. 2A. Though corresponding, some components also differ. To help identify components which correspond but nevertheless have differences, the numbering convention uses an alphabetic character. For example, pattern 216E(1) in FIG. 2E and pattern 216A(1) in FIG. 2A are both wiring patterns, with similarities being reflected in the common root 216* and the common parenthetical **(1), and with the differences being reflected in the alphabetic characters *E(*) and ***A(*). For brevity, the discussion will focus more on differences between FIG. 2E and FIG. 2A than on similarities.

For the example of FIG. 2E, in order to achieve (at least in part) the function which cell 206E represents, the following is assumed: M0 wiring patterns 218E(1), 220E(1), 222E(1) and 224E(1) represent corresponding inputs B1, A1, A2 and B2; M1 wiring pattern 228E represents output ZN; and wiring pattern 216E(1) is an intra-cell wiring pattern labeled I1.

In layout diagram 200E, the long axis of M1 wiring pattern 228E is substantially aligned with track 205V(7), whereas the long axis of M1 wiring pattern 228A is substantially aligned with track 205V(5) in FIG. 2A. Two instances of V0 pattern 226 are located at the intersections of track 205V(7) and corresponding tracks 205H(2) and 205H(5).

For substantially co-track pin pattern 218E(1) and wiring pattern 218E(2), the gap therebetween is located between the intersections of track 205H(2) with tracks 205V(4) and 205V(5). For substantially co-track pin pattern 224E(1) and wiring pattern 224E(2), the gap therebetween is located between the intersections of track 205H(5) with tracks 205V(3) and 205V(4).

In FIG. 2E, a benefit is that cell 206E represents a cell in which at least a majority of the pin patterns are concentrated in the M0 level. More particularly, cell 206E has five pin patterns, four of which are located in the M0 level, namely M0 pin patterns 218E(1), 220E(1), 222E(1) and 224E(1). Another benefit of cell 206E is that M0 pin patterns 218E(1), 220E(1), 222E(1) and 224E(1) are arranged substantially along four or fewer corresponding ones of the M0 tracks, namely tracks 205H(2), 205H(3), 205H(4) and 205H(5). Another benefit of cell 206E is improved flexibility resulting from the increased numbers of access points in the M0 level. By conserving the increased numbers of access points in the M0 level until a function for cell 206E is chosen, the improved flexibility of cell 206E is correspondingly preserved.

Regarding cell 206E, another benefit is that the arrangement of M0 pin patterns 218E(1), 220E(1), 222E(1) and 224E(1) avoids the stacked 2AP pattern circumstance (discussed above). As such, a further benefit is that the arrangement of M0 pin patterns 218E(1), 220E(1), 222E(1) and 224E(1) in cell 206E thereby prevents the stacked 2AP pattern problem (discussed above).

FIG. 2F is a layout diagram 200F of a cell 206F, in accordance with some embodiments.

Layout diagram 200F is similar to layout diagram 200A. FIG. 2F follows a similar numbering convention to that of FIG. 2A. Though corresponding, some components also differ. To help identify components which correspond but nevertheless have differences, the numbering convention uses an alphabetic character. For example, pattern 216F(1) in FIG. 2F and pattern 216A(1) in FIG. 2A are both wiring patterns, with similarities being reflected in the common root 216* and the common parenthetical **(1), and with the differences being reflected in the alphabetic characters *F(*) and ***A(*). For brevity, the discussion will focus more on differences between FIG. 2F and FIG. 2A than on similarities.

For the example of FIG. 2F, in order to achieve (at least in part) the function which cell 206F represents, the following is assumed: M0 wiring patterns 218F(2), 220F(1), 222F(1) and 224F(2) represent corresponding inputs B1, A1, A2 and B2; M1 wiring pattern 228F represents output ZN; and wiring pattern 216F(1) is an intra-cell wiring pattern labeled I1. Cell 206F includes an extra M1 routing track, namely 205V(8), as compared to cell 206A of FIG. 2A.

In layout diagram 200F, the long axis of M1 wiring pattern 228F is substantially aligned with track 205V(2), whereas the long axis of M1 wiring pattern 228A is substantially aligned with track 205V(5) in FIG. 2A. Two instances of V0 pattern 226 are located at the intersections of track 205V(7) and corresponding tracks 205H(2) and 205H(5).

For substantially co-track wiring pattern 218F(1) and pin pattern 218F(2), the gap therebetween is located between the intersections of track 205H(2) with tracks 205V(3) and 205V(4). For substantially co-track wiring pattern 224F(1) and pin pattern 224F(2), the gap therebetween is located between the intersections of track 205H(5) with tracks 205V(5) and 205V(6).

In FIG. 2F, a benefit is that cell 206F represents a cell in which at least a majority of the pin patterns are concentrated in the M0 level. More particularly, cell 206F has five pin patterns, four of which are located in the M0 level, namely M0 pin patterns 218F(2), 220F(1), 222F(1) and 224F(2). Another benefit of cell 206F is that M0 pin patterns 218F(2), 220F(1), 222F(1) and 224F(2) are arranged substantially along four or fewer corresponding ones of the M0 tracks, namely tracks 205H(2), 205H(3), 205H(4) and 205H(5). Another benefit of cell 206F is improved flexibility resulting from the increased numbers of access points in the M0 level. By conserving the increased numbers of access points in the M0 level until a function for cell 206F is chosen, the improved flexibility of cell 206F is correspondingly preserved.

Regarding cell 206F, another benefit is that the arrangement of M0 pin patterns 218F(2), 220F(1), 222F(1) and 224F(2) avoids the stacked 2AP pattern circumstance (discussed above). As such, a further benefit is that the arrangement of M0 pin patterns 218F(2), 220F(1), 222F(1) and 224F(2) in cell 206F thereby prevents the stacked 2AP pattern problem (discussed above).

Figure 2H:
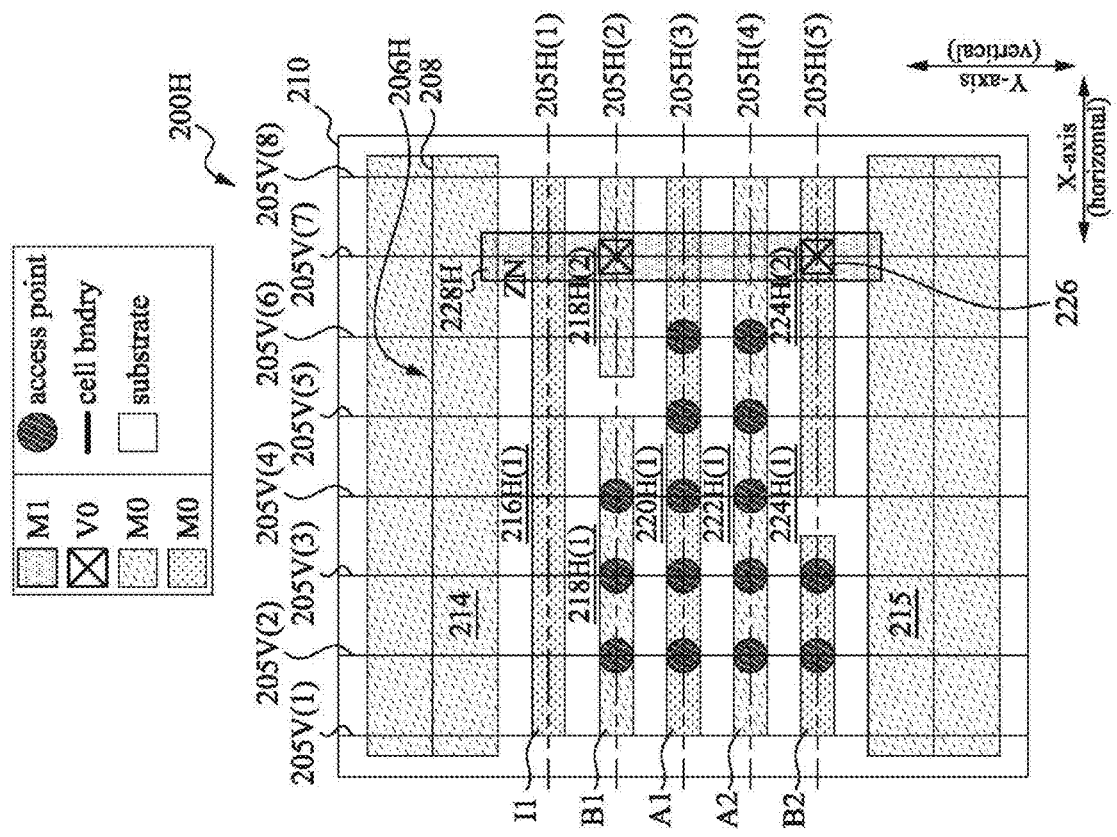
Figure 2G:
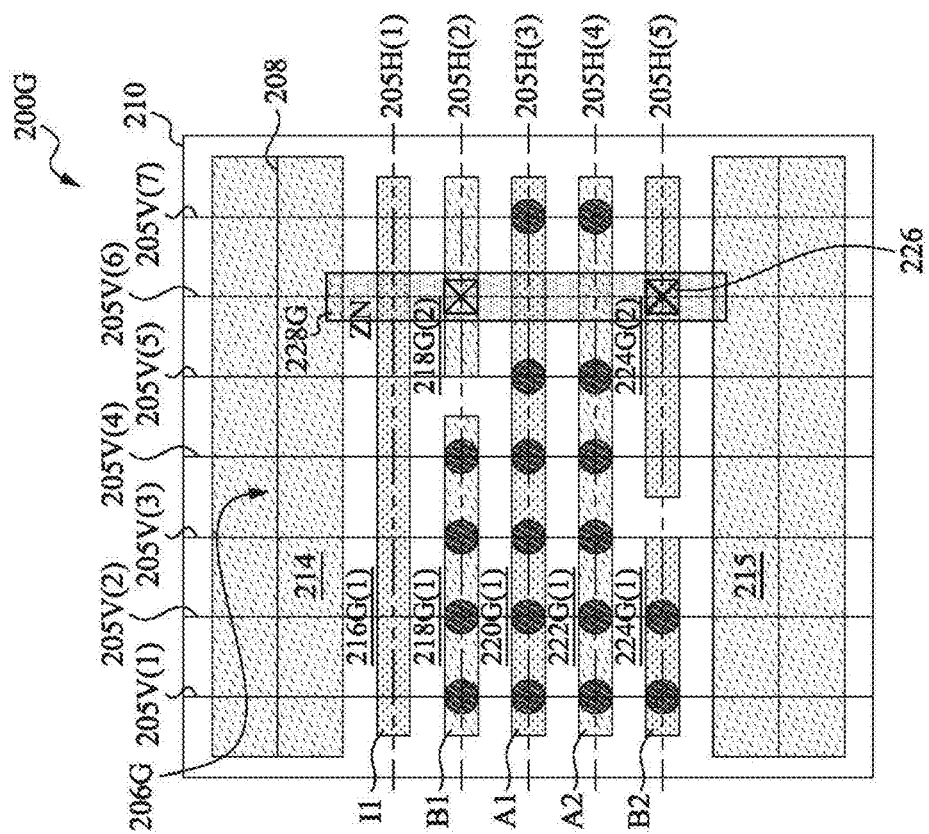

FIG. 2G is a layout diagram 200G of a cell 206G, in accordance with some embodiments.

Layout diagram 200G is similar to layout diagram 200A. FIG. 2G follows a similar numbering convention to that of FIG. 2A. Though corresponding, some components also differ. To help identify components which correspond but nevertheless have differences, the numbering convention uses an alphabetic character. For example, pattern 216G(1) in FIG. 2G and pattern 216A(1) in FIG. 2A are both wiring patterns, with similarities being reflected in the common root 216\* and the common parenthetical \*\*\*\*(1), and with the differences being reflected in the alphabetic characters \*\*\*G(\*) and \*\*\*A(\*). For brevity, the discussion will focus more on differences between FIG. 2G and FIG. 2A than on similarities.

For the example of FIG. 2G, in order to achieve (at least in part) the function which cell 206G represents, the following is assumed: M0 wiring patterns 218G(1), 220G(1), 222G(1) and 224G(1) represent corresponding inputs B1, A1, A2 and B2; M1 wiring pattern 228G represents output ZN; and wiring pattern 216G(1) is an intra-cell wiring pattern labeled I1.

In layout diagram 200G, the long axis of M1 wiring pattern 228G is substantially aligned with track 205V(7), whereas the long axis of M1 wiring pattern 228A is substantially aligned with track 205V(5) in FIG. 2A. Two instances of V0 pattern 226 are located at the intersections of track 205V(6) and corresponding tracks 205H(2) and 205H(5).

For substantially co-track pin pattern 218G(1) and wiring pattern 218G(2), the gap therebetween is located between the intersections of track 205H(2) with tracks 205V(4) and 205V(5). For substantially co-track pin pattern 224G(1) and wiring pattern 224G(2), the gap therebetween is located between the intersections of track 205H(5) with tracks 205V(3) and 205V(4).

In FIG. 2G, a benefit is that cell 206G represents a cell in which at least a majority of the pin patterns are concentrated in the M0 level. More particularly, cell 206G has five pin patterns, four of which are located in the M0 level, namely M0 pin patterns 218G(1), 220G(1), 222G(1) and 224G(1). Another benefit of cell 206G is that M0 pin patterns 218G(1), 220G(1), 222G(1) and 224G(1) are arranged substantially along four or fewer corresponding ones of the M0 tracks, namely tracks 205H(2), 205H(3), 205H(4) and 205H(5). Another benefit of cell 206G is improved flexibility resulting from the increased numbers of access points in the M0 level. By conserving the increased numbers of access points in the M0 level until a function for cell 206G is chosen, the improved flexibility of cell 206G is correspondingly preserved.

Regarding cell 206G, another benefit is that the arrangement of M0 pin patterns 218G(1), 220G(1), 222G(1) and 224G(1) avoids the stacked 2AP pattern circumstance (discussed above). As such, a further benefit is that the arrangement of M0 pin patterns 218G(1), 220G(1), 222G(1) and 224G(1) in cell 206G thereby prevents the stacked 2AP pattern problem (discussed above).

FIG. 2H is a layout diagram 200H of a cell 206H, in accordance with some embodiments.

Layout diagram 200H is similar to layout diagram 200A. FIG. 2H follows a similar numbering convention to that of FIG. 2A. Though corresponding, some components also differ. To help identify components which correspond but nevertheless have differences, the numbering convention uses an alphabetic character. For example, pattern 216H(1) in FIG. 2H and pattern 216A(1) in FIG. 2A are both wiring patterns, with similarities being reflected in the common root 216\* and the common parenthetical \*\*\*\*(1), and with the differences being reflected in the alphabetic characters \*\*\*H(\*) and \*\*\*A(\*). For brevity, the discussion will focus more on differences between FIG. 2H and FIG. 2A than on similarities.

For the example of FIG. 2H, in order to achieve (at least in part) the function which cell 206H represents, the following is assumed: M0 wiring patterns 218H(1), 220H(1), 222H(1) and 224H(1) represent corresponding inputs B1, A1, A2 and B2; M1 wiring pattern 228H represents output ZN; and wiring pattern 216H(1) is an intra-cell wiring pattern labeled I1. Cell 206F includes an extra M1 routing track, namely 205V(8), as compared to cell 206A of FIG. 2A.

In layout diagram 200H, the long axis of M1 wiring pattern 228H is substantially aligned with track 205V(7), whereas the long axis of M1 wiring pattern 228A is substantially aligned with track 205V(5) in FIG. 2A. Two instances of V0 pattern 226 are located at the intersections of track 205V(7) and corresponding tracks 205H(2) and 205H(5).

For substantially co-track pin pattern 218H(1) and wiring pattern 218H(2), the gap therebetween is located between the intersections of track 205H(2) with tracks 205V(5) and 205V(6). For substantially co-track pin pattern 224H(1) and wiring pattern 224H(2), the gap therebetween is located between the intersections of track 205H(5) with tracks 205V(3) and 205V(4).

In FIG. 2H, a benefit is that cell 206H represents a cell in which at least a majority of the pin patterns are concentrated in the M0 level. More particularly, cell 206H has five pin patterns, four of which are located in the M0 level, namely M0 pin patterns 218H(1), 220H(1), 222H(1) and 224H(1). Another benefit of cell 206H is that M0 pin patterns 218H(1), 220H(1), 222H(1) and 224H(1) are arranged substantially along four or fewer corresponding ones of the M0 tracks, namely tracks 205H(2), 205H(3), 205H(4) and 205H(5). Another benefit of cell 206H is improved flexibility resulting from the increased numbers of access points in the M0 level. By conserving the increased numbers of access points in the M0 level until a function for cell 206H is chosen, the improved flexibility of cell 206H is correspondingly preserved.

Regarding cell 206H, another benefit is that the arrangement of M0 pin patterns 218H(1), 220H(1), 222H(1) and 224H(1) avoids the stacked 2AP pattern circumstance (discussed above). As such, a further benefit is that the arrangement of M0 pin patterns 218H(1), 220H(1), 222H(1) and 224H(1) in cell 206H thereby prevents the stacked 2AP pattern problem (discussed above).

FIGS. 2I(1), 2I(2) and 2I(3) are corresponding layout diagrams 200I(1), 200I(2) and 200I(3) of corresponding cells 206I(1), 206I(2) and 206I(3), in accordance with some embodiments.

Layout diagrams 200I(1), 200I(2) and 200I(3) are similar to layout diagram 200A. FIGS. 2I(1), 2I(2) and 2I(3) follow a similar numbering convention to that of FIG. 2A. Though corresponding, some components also differ. To help identify components which correspond but nevertheless have differences, the numbering convention uses an alphabetic character. For example, pattern 216I(1) in FIG. 2I(3) and pattern 216A(1) in FIG. 2A are both wiring patterns, with similarities being reflected in the common root 216\* and the common parenthetical \*\*\*\*(1), and with the differences being reflected in the alphabetic characters \*\*\*I(\*) and \*\*\*A(\*). For brevity, the discussion will focus more on differences between FIGS. 2I(1)-2I(3) and FIG. 2A than on similarities.

FIG. 2I(1) is a combination of FIGS. 2I(2) and 2I(3). More particularly, if cell 206I(3) of FIG. 2I(3) were to be disposed over cell 206I(2) of FIG. 2I(2), the result would be cell 206I(1) of FIG. 2I(1). Stated differently, each of cells 206I(2) and 206I(3) of corresponding FIGS. 2I(2) and 2I(3) is a simplification of cell 206I(1) of FIG. 2I(1).

In FIGS. 2I(1)-2I(3), as an example, the function which cells 206I(1)-206I(3) represent is AND-OR-INVERT (AOI), and more particularly AOI22. For the example of FIG. 2I, in order to achieve (at least in part) the function which cells 206I(1)-206I(3) represent, namely AOI22, the following is assumed: M0 wiring patterns 281I(1), 281I(2), 220I(1), 220I(2) and 222I(1) represent corresponding inputs B2, B1, A2 and A1; M1 wiring pattern 228I represents output ZN; and wiring patterns 216I(1) and 224I(1) are intra-cell wiring patterns correspondingly labeled I1 and I2. Cells 206I(1)-206I(3) include extra M1 routing tracks, namely 205V(8) and 205V(9), as compared to cell 206A of FIG. 2A.

In layout diagram 200I(3), the long axis of M1 wiring pattern 228I is substantially aligned with track 205V(9), whereas the long axis of M1 wiring pattern 228A is substantially aligned with track 205V(5) in FIG. 2A. Two instances of V0 pattern 226 are located at the intersections of track 205V(7) and corresponding tracks 205H(2) and 205H(5).

In FIG. 2I(2), cell 206I(2) includes: rectangular fin patterns 230(1)-230(2); and rectangular metal-over-drain/source (MD) patterns 234(1)-234(10). Long axes of fin patterns 230(1)-230(2) extend substantially parallel to the X-axis. Relative to the Y-axis, fin pattern 230(1) overlaps track 205H(1), and fin pattern 230(2) overlaps track 205H(5). Long axes of MD patterns 234(1)-234(10) extend substantially parallel to the Y-axis. Long axes of MD patterns 234(1), 234(2), 234(3), 234(4) and 234(5) are substantially aligned with corresponding tracks 205V(2), 205V(4), 205V(6), 205V(8) and 205V(10). MD patterns 234(1), 234(2), 234(3), 234(4) and 234(5) overlap corresponding portions of fin pattern 230(1). Long axes of MD patterns 234(6), 234(7), 234(8), 234(9) and 234(10) are substantially aligned with corresponding tracks 205V(2), 205V(4), 205V(6), 205V(8) and 205V(10). MD patterns 234(6), 234(7), 234(8), 234(9) and 234(10) overlap corresponding portions of fin pattern 230(2). M0 patterns 234(1)-234(10) represent corresponding conductive segments in layer M0 of metallization of a semiconductor device based on layout diagrams 200I(1)-200I(3).

In FIG. 2I(2), fin patterns 230(1)-230(2) represent corresponding NMOS and PMOS fins, or corresponding PMOS and NMOS fins, in a semiconductor device based on layout diagrams 200I(1)-200I(3). Accordingly, fin patterns 230(1)-230(2) are designated for corresponding NMOS finFET and PMOS finFET configuration, or corresponding PMOS finFET and NMOS finFET configuration. In some embodiments, patterns 230(1)-230(2) represent active areas having corresponding NMOS and PMOS, or corresponding PMOS and NMOS, planar-transistor configurations in a semiconductor device based on layout diagrams 200I(1)-200I(3). In some embodiments, fin patterns 230(1)-230(2) are designated for nano-wire configuration. In some embodiments, fin patterns 230(1)-230(2) are designated for nano-sheet configuration. In some embodiments, fin patterns 230(1)-230(2) are designated for Gate-All-Around (GAA) configuration. In some embodiments, quantities of fin patterns other than the quantities shown in FIG. 2I(1)-2I(2) are included in corresponding cells 206I(1)-206I(2).

Cell 206I(2) further includes rectangular gate patterns 232(1)-232(6); and rectangular cut patterns 236(1)-236(4). Long axes of gate patterns 232(1)-232(6) are substantially aligned with corresponding tracks 205V(1), 205V(3), 205V(5), 205V(7), 205V(9) and 205V(11). Relative to the X-axis gate patterns 232(1)-232(6) are separated from each other by a uniform distance. In some embodiments, the uniform distance represents one contacted poly pitch (CPP) for the corresponding semiconductor process technology node.

Long axes of cut patterns 236(1), 236(2), 236(3) and 236(2) extend substantially parallel to the X-axis. In general, where a subject pattern underlies a given cut pattern such that a portion of the subject pattern is overlapped by the given cut pattern, the given cut pattern is used to indicate that the overlapped portion of the subject pattern eventually will be removed during fabrication of a corresponding semiconductor device. Cut patterns 236(1), 236(2), 236(3) and 236(2) are gate-cut patterns corresponding to gate patterns 232(1), 232(2), 232(3), 232(4), 232(5) and 232(6). In particular, relative to the Y-axis, cut pattern 236(1) overlies corresponding upper portions of gate patterns 232 (2), 232(3), 232(4) and 232(5). Cut pattern 236(2) overlies a middle portion of gate pattern 232(1). Cut pattern 236(3) overlies a middle portion of gate pattern 232(6). Cut pattern 236(4) overlies corresponding lower portions of gate patterns 232(2), 232(3), 232(4) and 232(5).

In FIG. 2I(3), in addition to M0 patterns 214, 215, 216I(1), 281I(1), 281I(2), 220I(1), 220I(2), 222I(1), 224I(1) and 224I(2), V0 patterns 226, and M1 pattern 228I, cell 206I(3) further includes instances of VD pattern 238 and instances of VG pattern 240. Instances of VD pattern 238 represent corresponding VD structures in a transistor layer of a semiconductor device based on layout diagrams 200I(1)-200I(3). A VD structure (see FIG. 4B) electrically couples a drain/source structure of a transistor to a corresponding M0 conductive segment. Instances of VG pattern 240 represent corresponding VG structures in a transistor layer of a semiconductor device based on layout diagrams 200I(1)-200I(3). A VG structure (see FIG. 4B) electrically couples a gate structure of a transistor to a corresponding M0 conductive segment.

Assuming for a moment that the function AOI22 had not yet been chosen for cells 206I(1)-206I(3), layout diagram 200I(3) shows access points at the following intersections: five access points where pin pattern 281I(1) intersects tracks 205V(1), 205V(2), 205V(3), 205V(4) and 205V(5); five access points where pin pattern 220I(1) intersects tracks 205V(1), 205V(2), 205V(3), 205V(4) and 205V(5); three access points where pin pattern 220I(2) intersects tracks 205V(7), 205V(8) and 205V(9); and nine access points where pin pattern 222A(1) intersects tracks 205V(1), 205V (2), 205V(3), 205V(4), 205V(5), 205V(6), 205V(7), 205V (8) and 205V(9).

Having chosen the function AOI22 for cells 206I(1)-206I (3), layout diagram 200I(3) indicates which selected ones of the access points have been chosen to help implement the function AOI22, doing so by showing instances of VD pattern 238 or VG pattern 240 at the selected access points. More particularly, an instance of VG pattern 240 is located at the access point corresponding to the intersection of M0 pin pattern 281I(1) and track 205V(2), which reflects the access point having been selected. An instance of VG pattern 240 is located at the access point corresponding to the intersection of M0 pin pattern 220I(1) and track 205V(4), which reflects the access point having been selected. An instance of VG pattern 240 is located at the access point corresponding to the intersection of M0 pin pattern 220I(2) and track 205V(8), which reflects the access point having been selected. An instance of VG pattern 240 is located at the access point corresponding to the intersection of M0 pin pattern 222I(1) and track 205V(6), which reflects the access point having been selected.

It is noted instances of VD pattern 238 are located at the intersections of M0 intra-cell wiring pattern 216I(1) and corresponding tracks 205V(1), 205V(5) and 205V(9). An instance of VD pattern 238 is located at the intersection of M0 wiring pattern 281I(2) and track 205V(7). An instance of VD pattern 238 is located at the intersection of M0 wiring pattern 224I(2) and track 205V(5).

For substantially co-track pin pattern 281I(1) and wiring pattern 281I(2), the gap therebetween is located substantially at the intersection of track 205H(2) with track 205V(6). For substantially co-track pin pattern 220I(1) and pin pattern 220I(2), the gap therebetween is located substantially at the intersection of track 205H(3) with track 205V(6). For substantially co-track wiring pattern 224I(1) and wiring pattern 224I(2), the gap therebetween is located between the intersection of track 205H(5) with track 205V(4).

In FIGS. 2I(1)-2I(3), a benefit is that cells 206I(1) and 206I(2) represent a cell in which at least a majority of the pin patterns are concentrated in the M0 level. More particularly, cells 206I(1) and 206I(2) have five pin patterns, four of which are located in the M0 level, namely M0 pin patterns 281I(1), 220I(1), 220I(2) and 222I(1). Another benefit of cells 206I(1) and 206I(2) is that M0 pin patterns 281I(1), 220I(1), 220I(2) and 222I(1) are arranged substantially along three or fewer corresponding ones of the M0 tracks, namely tracks 205H(2), 205H(3) and 205H(4). Another benefit of cell 206I is improved flexibility resulting from the increased numbers of access points in the M0 level. By conserving the increased numbers of access points in the M0 level until a function for cells 206I(1)-206I(3) is chosen, the improved flexibility of cells 206I(1)-206(3) is correspondingly preserved.

Regarding cells 206I(1) and 206I(3), another benefit is that the arrangement of M0 pin patterns 281I(1), 220I(1), 220I(2) and 222I(1) avoids the stacked 2AP pattern circumstance (discussed above). As such, a further benefit is that the arrangement of M0 pin patterns 281I(1), 220I(1), 220I(2) and 222I(1) in cells 206I(1) and 206I(3) thereby prevents the stacked 2AP pattern problem (discussed above).

Figure 3:
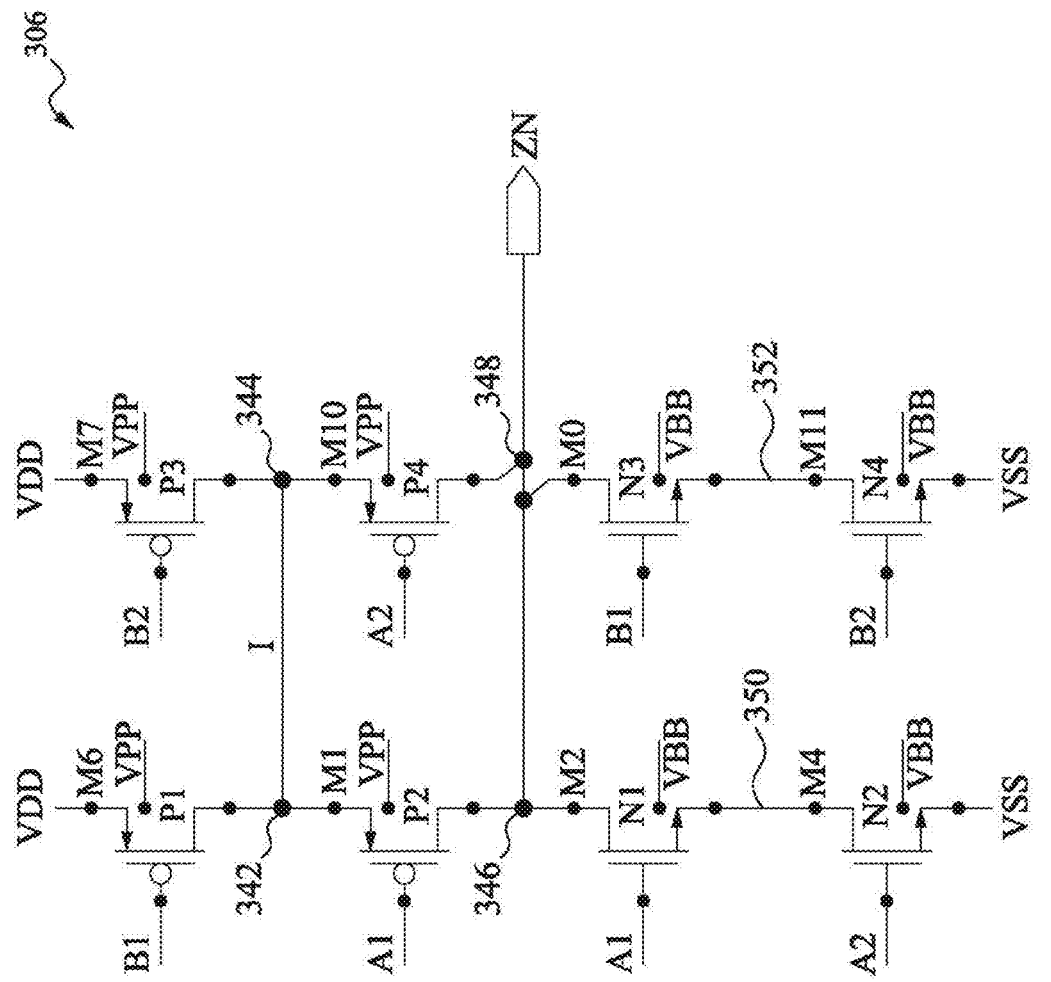
FIG. 3 is a circuit diagram, in accordance with some embodiments.

FIG. 3 is a circuit diagram of a circuit 306, in accordance with some embodiments.

In particular, circuit 306 is an AOI22 circuit corresponding to the AOI22 function of cell 206I(1) of FIG. 2I(1).

In FIG. 3, AOI22 circuit 306 includes PMOS transistors P1, P2, P3 and P4, and NMOS transistors N1, N2, N3 and N4. Transistors P1 and P3 are coupled between VDD and corresponding nodes 342 and 344. Nodes 342 and 344 are coupled together. Transistors P2 and P4 are coupled between corresponding nodes 342 and 344 and corresponding nodes 346 and 348. Nodes 346 and 348 are coupled together to provide output ZN. Transistors N1 and N3 are coupled between corresponding nodes 346 and 348 and corresponding nodes 350 and 352. Transistors N2 and N4 are coupled between corresponding nodes 350 and 352 and VSS.

Input signal B1 is provided on the gate terminals of transistors P1 and N3. Input signal B2 is provided on the gate terminals of transistors P3 and N4. Input signal A1 is provided on the gate terminals of transistors P2 and N1. Input signal A2 is provided on the gate terminals of transistors P4 and N2.

Figure 4B:
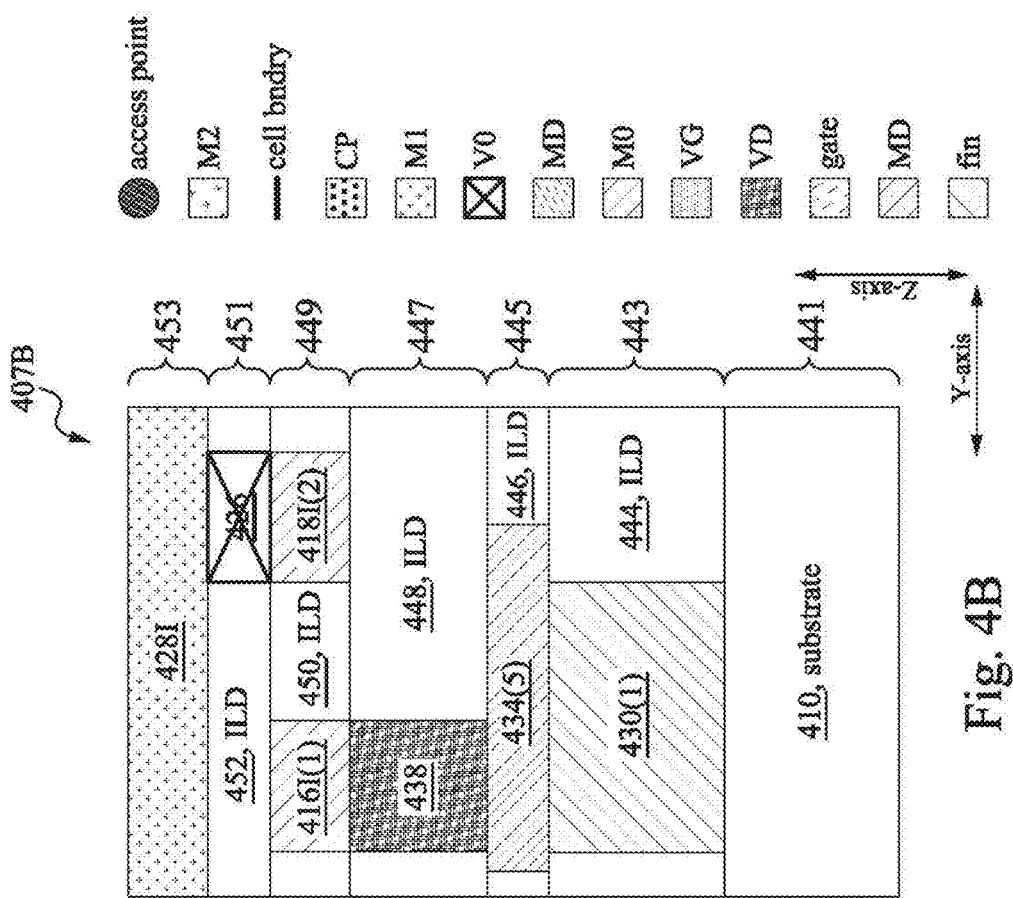
FIGS. 4A-4B are corresponding cross-sections of corresponding parts of a cell region of a semiconductor device, in accordance with some embodiments.
Figure 4A:
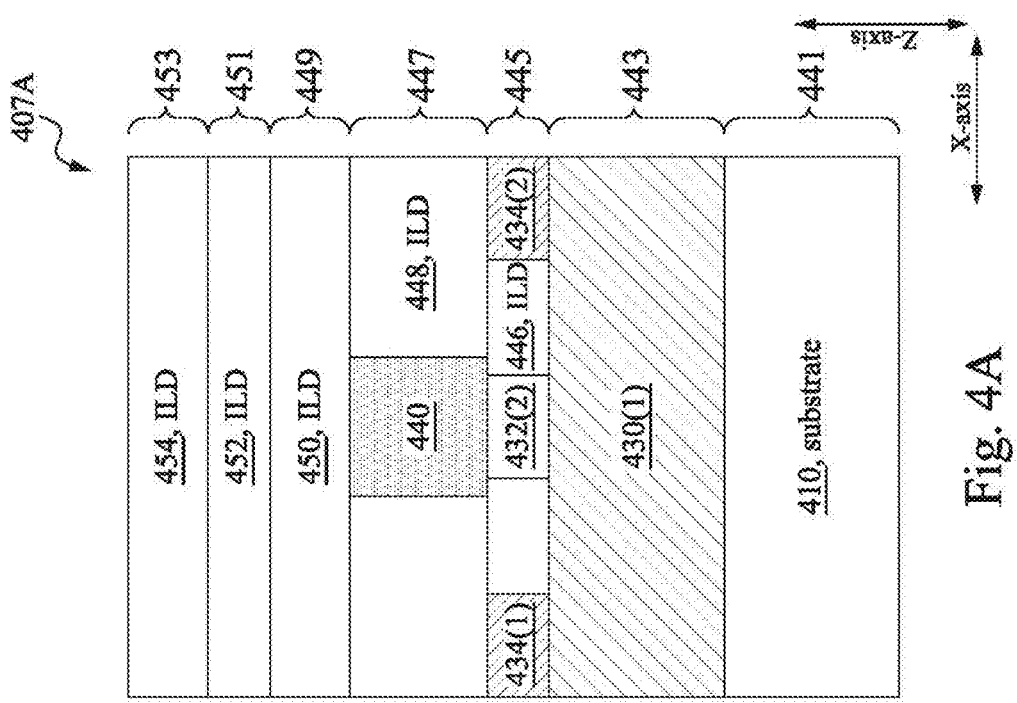

FIGS. 4A-4B are corresponding cross-sections 407A and 407B of corresponding parts of a cell region of a semiconductor device, in accordance with some embodiments.

Cross-sections 407A-407B are corresponding parts of a cell region of a semiconductor device which is fabricated based on a larger layout diagram which includes a smaller layout diagram such as the layout diagrams disclosed herein, e.g., layout diagram 200I(1) of FIG. 2I(1), which includes cell 206I(1). As such, cross-sections 407A-407B are examples of parts of cell region 102 of semiconductor device 100 of FIG. 1.

Cross-sections 407A-407B follow a similar numbering scheme to that of layout diagram 200I(1) of FIG. 2I(1). Though corresponding, some components also differ. To help identify components which correspond but nevertheless have differences, the numbering convention uses 4-series numbers for cross-sections 407A-407B while layout diagram 200I(1) uses 2-series numbers. For example, fin 430(1) in FIGS. 4A-4B corresponds to fin pattern 230(1) in FIG. 2I(2), with similarities being reflected in the common root *30(*) and the common parenthetical **(1), and with the differences being reflected in the corresponding leading digit 4(*) and 2**(*). For brevity, the discussion will focus more on differences between FIGS. 4A-4B and FIG. 2I(1) than on similarities.

In FIGS. 4A-4B, each of cross-sections 407A-407B includes layers 441, 443, 445, 447, 449, 451 and 453. Layer 443 is formed on layer 441. Layer 445 is formed on layer 443. Layer 447 is formed on layer 445. Layer 449 is formed on layer 447. Layer 451 is formed on layer 449. Layer 453 is formed on layer 451.

Layer 441 is a substrate layer. Together, layers 443, 445 and 447 represent a transistor layer in which transistors are formed. Layer 443 is an active area layer. Layer 445 is a MD/GATE layer. Layer 447 is a VD/VG layer.

In cross-sections 407A-407B, layer 449 represents a first layer of metallization, M*1st, in a semiconductor device having been fabricated based on a larger layout diagram which includes a smaller layout diagram, e.g., layout diagram 200I(1) of FIG. 2I(1). For consistency with layout diagram 200I(1), the M*1st layer is M0. Layer 451 represents an interconnect layer inserted between M0 layer 449 and M1 layer 453 of metallization.

Regarding layer 443 in FIG. 4A, cross-section 407A includes fin 430(1). Regarding layer 443 in FIG. 4B, cross-section 407B includes fin 430(1) and an interlayer dielectric (ILD) 444.

Regarding layer 445 in FIG. 4A, cross-section 407A includes MD segments 434(1) and 434(2), ILD 446 and gate segment 432(2). Regarding layer 445 in FIG. 4B, cross-section 407B includes MD segment 434(5) and ILD 446.

Regarding layer 447 in FIG. 4A, cross-section 407A includes VG structure 440 and ILD 448. Regarding layer 447 in FIG. 4B, cross-section 407B includes VD structure 438 and ILD 448.

Regarding layer 449 in FIG. 4A, cross-section 407A includes ILD 450. Regarding layer 449 in FIG. 4B, cross-section 407B includes M0 conductive segments 416I(1) and 418I(2) and ILD 450.

Regarding layer 451 in FIG. 4A, cross-section 407A includes ILD 452. Regarding layer 451 in FIG. 4B, cross-section 407B includes V0 structure 426 and ILD 452.

Regarding layer 453 in FIG. 4A, cross-section 407A includes ILD 454. Regarding layer 453 in FIG. 4B, cross-section 407B includes M1 conductive segment 428(I).

Figure 5:
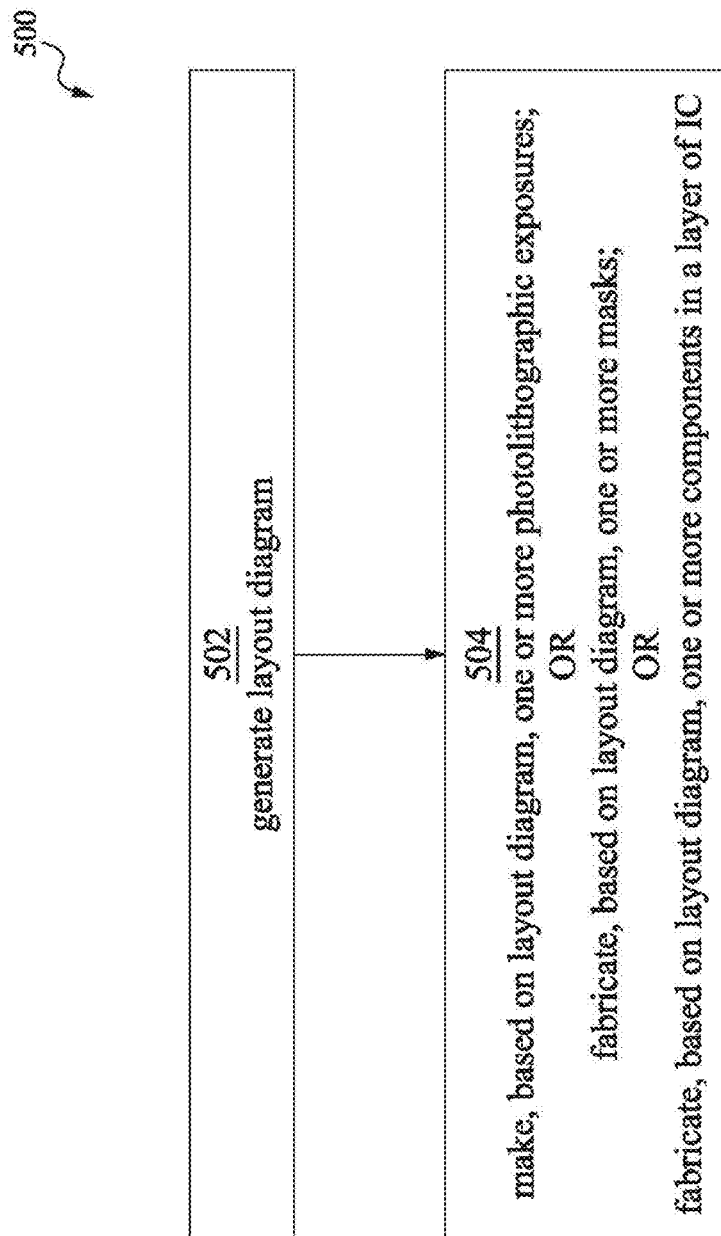
FIG. 5 is a flowchart of a method of generating a layout diagram, in accordance with some embodiments.

FIG. 5 is a flowchart of a method 500 of generating a layout diagram, in accordance with some embodiments.

Method 500 is implementable, for example, using EDA system 700 (FIG. 7, discussed below) and an integrated circuit (IC), manufacturing system 800 (FIG. 8, discussed below), in accordance with some embodiments. Regarding method 500, examples of the layout diagram include layout diagrams 200A-200H and 200I(1) of corresponding FIGS. 2A-2H and 2I(1). Examples of a semiconductor device which can be manufactured according to method 500 include semiconductor device 100 FIG. 1.

In FIG. 5, method 500 includes blocks 502-504. At block 502, a layout diagram is generated which, among other things, has at least a majority of the pin patterns concentrated in the M*1st level, which has benefits including one or more of improving routability at least by decreasing a number of wiring patterns in the M*2nd level which are designated as pin patterns, or improving flexibility at least by increasing by a number of points/locations at which connections potentially could be made (access points) to M*1st pin patterns, or the like. An example of a semiconductor device corresponding to a layout generated by method 500 includes semiconductor device 100 of FIG. 1. Block 502 is discussed in more detail below with respect to FIG. 6A. From block 502, flow proceeds to block 504.

At block 504, based on the layout diagram, at least one of (A) one or more photolithographic exposures are made or (B) one or more semiconductor masks are fabricated or (C) one or more components in a layer of a semiconductor device are fabricated. See discussion below of FIG. 8.

Figure 6A:
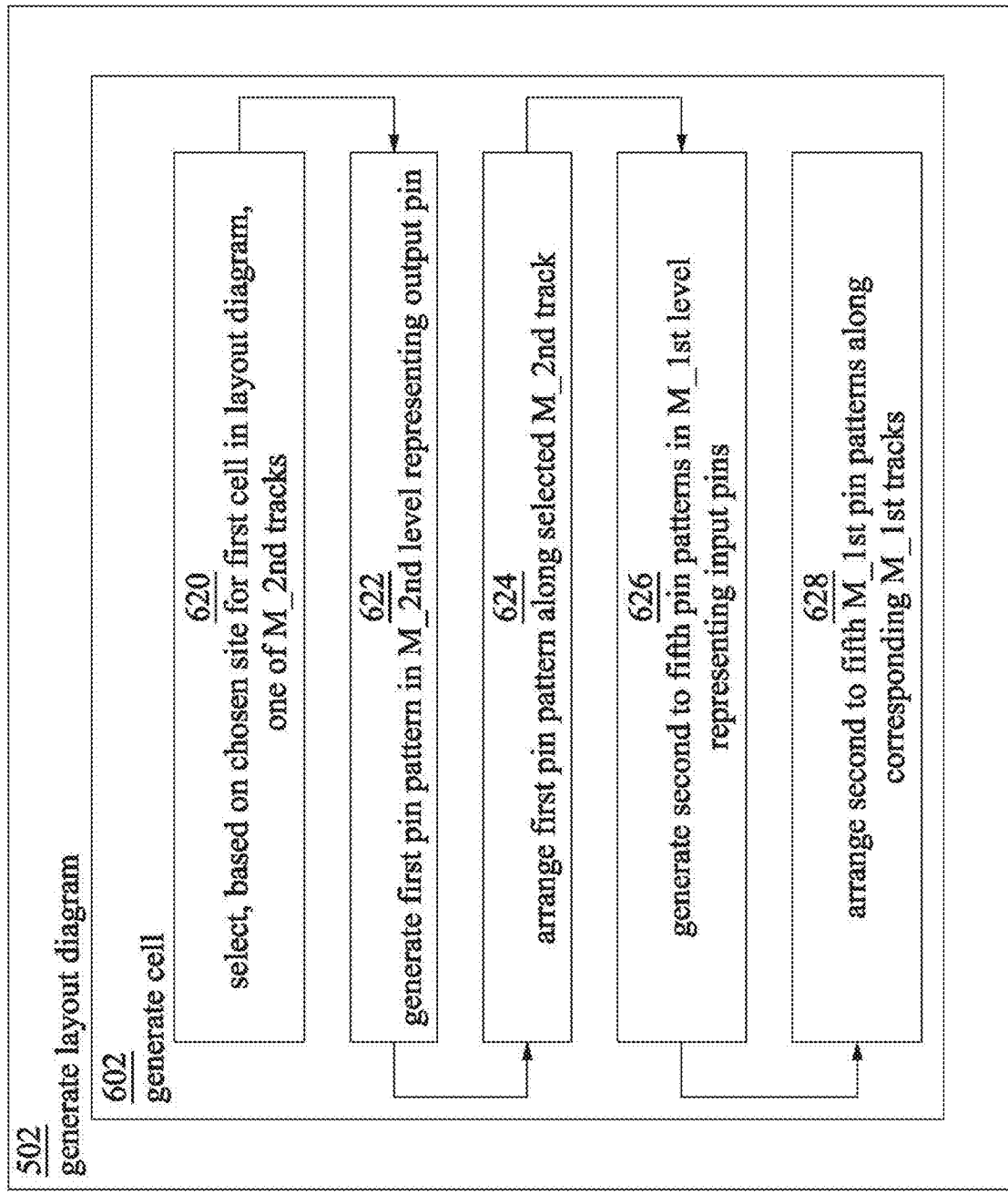

FIG. 6A is a flowchart of a method of generating a layout diagram, in accordance with some embodiments.

More particularly, the method of FIG. 6A shows additional blocks included in block 502 of FIG. 5, in accordance with one or more embodiments.

Block 502 is implementable, for example, using EDA system 700 (FIG. 7, discussed below), in accordance with some embodiments. Regarding block 502, examples of the layout diagrams which generated according to block 502 include layout diagrams 200A-200H and 200I(1), or the like. Examples of a semiconductor device which can be manufactured based on layout diagrams generated according to block 502 include semiconductor device 100 FIG. 1, and semiconductor devices based on layout diagrams 200A-200H and 200I(1), or the like.

In FIG. 6A, block 502 includes block 602. At block a cell is generated. Examples of the cell include cells 206A-206H and 206I(1) of corresponding FIGS. 2A-2H and 2I(1). Block 602 includes blocks 620-628.

At block 620, based on a chosen site in the layout diagram, one the M*2nd tracks is selected. Examples of the selected M*2nd tracks include track 205V(5) in FIGS. 2A and 2D, track 205V(4) in FIGS. 2B and 2C, track 205V(7) in FIGS. 2E and 2H, track 205V(2) in FIG. 2F, track 205V(6) in FIG. 2G and track 205V(10) in FIG. 2I(1). From block 620, flow proceeds to block 622.

At block 622, a first pin pattern is generated in the M*2nd level which represents an output pin in a semiconductor device based on the layout diagram. Examples of such first pin patterns in the M*2nd level include M1 pin patterns 228A-228I in corresponding FIGS. 2A-2H and 2I(3). From block 622, flow proceeds to block 624. At block 624, the first pin pattern is arranged along the selected track. From block 624, flow proceeds to block 626.

At block 626, second to fifth pin patterns are generated in the M*1st level, which represent corresponding input pins in a semiconductor device based on the layout diagram. Examples of the second to fifth pin patterns in the M*1st level include: M0 pin patterns 218A(1), 220A(1), 220A(2) and 222A(1) in FIG. 2A; M0 pin patterns 218B(2), 220B(1), 220B(2) and 222B(1) in FIG. 2B; M0 pin patterns 218C(2), 220C(1), 220C(2) and 222C(1) in FIG. 2C; M0 pin patterns 218D(1), 220D(1), 220D(2) and 222D(1) in FIG. 2D; M0 pin patterns 218E(1), 220E(1), 222E(1) and 224E(1) in FIG. 2E; pin patterns 218F(2), 220F(1), 222F(1) and 224F(2) in FIG. 2F; M0 pin patterns 218G(1), 220G(1), 222G(1) and 224G(1) in FIG. 2G; M0 pin patterns 218H(1), 220H(1), 222H(1) and 224H(1) in FIG. 2H; and M0 pin patterns 218I(1), 220I(1), 220I(2) and 222I(1) in FIG. 2I(3). From block 626, flow proceeds to block 628.

At block 628, the second to fifth patterns in the M*1st level are arranged along corresponding M*1st tracks. Examples of M0 tracks used for such arrangements include: M0 tracks 205H(2), 205H(3) and 205H(4) used in FIGS. 2A-2D and 2I(3); and M0 tracks 205H(2), 205H(3), 205H(4) and 205H(5) used in FIGS. 2E-2H.

FIG. 6B is a flowchart of a method of generating a layout diagram, in accordance with some embodiments.

More particularly, the method of FIG. 6B shows block 628 of FIG. 6A in more detail, in accordance with one or more embodiments.

In FIG. 6B, block 628 includes block 632. At block 632, two of the second to fifth pin patterns are substantially co-track aligned. Examples of two of the second to fifth pin patterns which are substantially co-track aligned include: M0 pin patterns 220A(1) and 220A(2) in FIG. 2A which are substantially aligned with M0 track 205H(3); M0 pin patterns 220B(1) and 220B(2) in FIG. 2B which are substantially aligned with M0 track 205H(3); M0 pin patterns 220C(1) and 220C(2) in FIG. 2C which are substantially aligned with M0 track 205H(3); M0 pin patterns 220D(1) and 220D(2) in FIG. 2D which are substantially aligned with M0 track 205H(3); and M0 pin patterns 220I(1) and 220I(2) in FIG. 2I(3) which are substantially aligned with M0 track 205H(3).

FIG. 6C is a flowchart of a method of generating a layout diagram, in accordance with some embodiments.

More particularly, the method of FIG. 6C shows block 626 of FIG. 6A in more detail, in accordance with one or more embodiments.

In FIG. 6C, block 626 includes block 642. At block 642, each of the second to fifth M0 pin patterns is configured to have at least two access points. Examples of each of the second to fifth M0 pin patterns in layout diagram being configured to have at least two access points include layout diagrams 200A-200H and 200I(3) of corresponding FIGS. 2A-2H and 2I(3). More particularly, regarding the example of FIG. 2A, layout diagram 200A includes: three access points where pin pattern 218A(1) intersects tracks 205V(1), 205V(2) and 205V(3); four access points where pin pattern 220A(1) intersects tracks 205V(1), 205V(2), 205V(3) and 205V(4); two access points where pin pattern 220A(2) intersects tracks 205V(6) and 205V(7); and six access points where pin pattern 222A(1) intersects tracks 205V(1), 205V(2), 205V(3), 205V(4), 205V(6) and 205V(7). More particularly, regarding the example of FIG. 2I(3), layout diagram 200I(3) includes: five access points where pin pattern 281I(1) intersects tracks 205V(1), 205V(2), 205V(3), 205V(4) and 205V(5); five access points where pin pattern 220I(1) intersects tracks 205V(1), 205V(2), 205V(3), 205V(4) and 205V(5); three access points where pin pattern 220I(2) intersects tracks 205V(7), 205V(8) and 205V(9); and nine access points where pin pattern 222A(1) intersects tracks 205V(1), 205V(2), 205V(3), 205V(4), 205V(5), 205V(6), 205V(7), 205V(8) and 205V(9).

In FIG. 6C, block 642 includes block 644. At block 644, at least one of the second to fifth M0 pin patterns is configured to have at least: 3 access points; or 4 access points; or 5 access points; or 6 access points. Examples of M0 pin patterns configured to have at least three access points include: 218A(1), 220B(2), 220C(2), 220D(1), 218F(2), 218H(1) and 220I(2). Examples of M0 pin patterns configured to have at least four access points include:

220A(1), 218E(1) and 218G(1). Examples of M0 pin patterns configured to have at least five access points include: 222B(1), 222D(1), 220F(1), 222F(1), 220H(1), 222H(1), 281I(1) and 220I(2). Examples of M0 pin patterns configured to have at least six access points include: 222A(1), 222C(1), 220E(1), 222E(1), 220G(1) and 222G(2). An example of an M0 pin pattern configured to have at least nine access points is 222I(1).

Figure 6D:
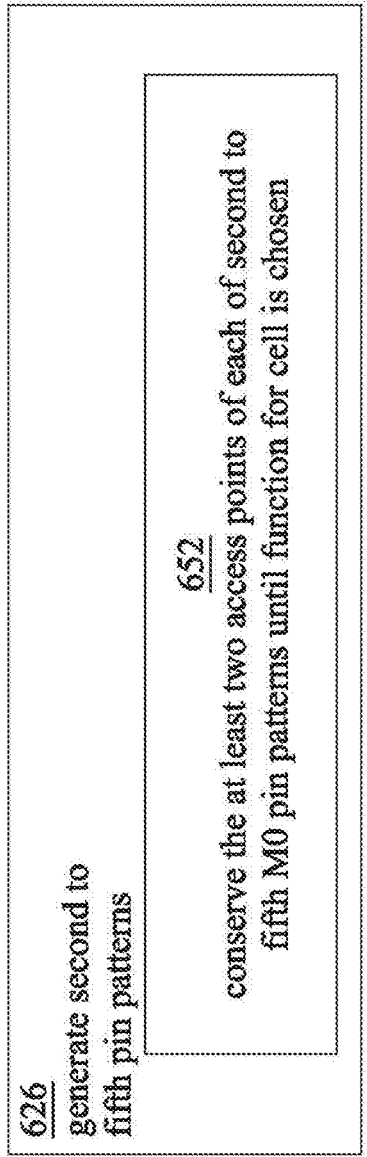

FIG. 6D is a flowchart of a method of generating a layout diagram, in accordance with some embodiments.

More particularly, the method of FIG. 6D shows block 626 of FIG. 6A in more detail, in accordance with one or more embodiments.

In FIG. 6D, block 626 includes block 652. At block 652, the at least two access points of each of the second to fifth M0 pin patterns are conserved until a function for the cell is chosen. In some embodiments, the conservation of access points is understood to mean that no access points are selected as a location for corresponding via-based connections until a function for the cell is chosen. An example which shows access points which had been conserved as well as the access points which were selected (see discussion of FIG. 6E below) is found in layout diagram 200I(3) of FIG. 2I(3). More particularly, assuming (again) for a moment that the function AOI22 had not yet been chosen for cells 206I(1)-206I(3), layout diagram 200I(3) shows access points at the following intersections: five access points where pin pattern 281I(1) intersects tracks 205V(1), 205V(2), 205V(3), 205V(4) and 205V(5); five access points where pin pattern 220I(1) intersects tracks 205V(1), 205V(2), 205V(3), 205V(4) and 205V(5); three access points where pin pattern 220I(2) intersects tracks 205V(7), 205V(8) and 205V(9); and nine access points where pin pattern 222A(1) intersects tracks 205V(1), 205V(2), 205V(3), 205V(4), 205V(5), 205V(6), 205V(7), 205V(8) and 205V(9).

Figure 6E:
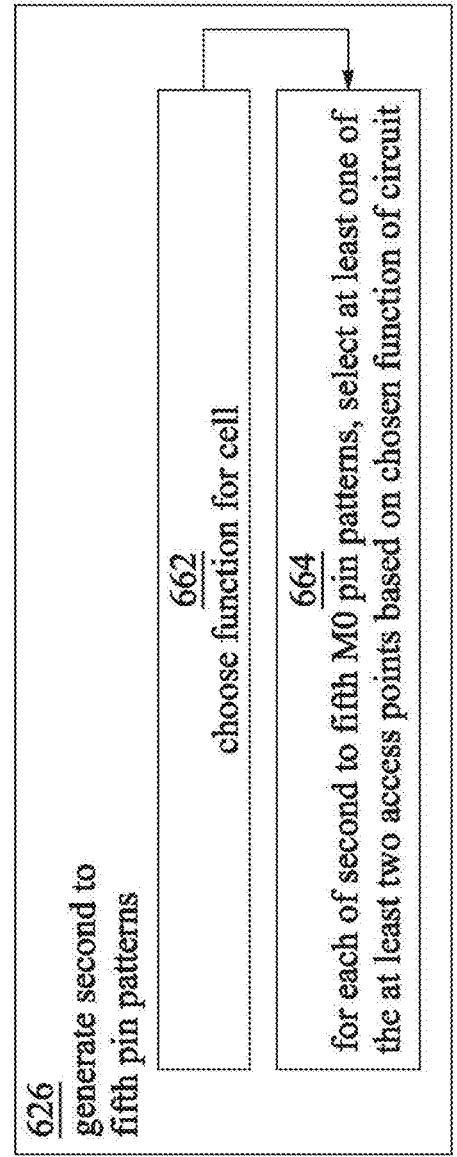

FIG. 6E is a flowchart of a method of generating a layout diagram, in accordance with some embodiments.

More particularly, the method of FIG. 6E shows block 626 of FIG. 6A in more detail, in accordance with one or more embodiments.

In FIG. 6E, block 626 includes blocks 662-664. At block 662, a function for the cell is chosen. An example of choosing a function for the cell is the choice of function AOI22 for cells 206I(1)-206I(3) in corresponding FIGS. 2I(1)-2I(3). From block 662, flows to block 664.

At block 664, for each of the second to fifth M0 pin patterns, at least one of the at least two access points is selected as a location for a via-based connection. Examples of selecting access for via-based connections as shown in layout diagram 200I(3) of FIG. 2I(3), which indicates the selections by showing instances of VD pattern 238 or VG pattern 240 at the selected access points. More particularly, in FIG. 2I(3), an instance of VG pattern 240 is located at the access point corresponding to the intersection of M0 pin pattern 281I(1) and track 205V(2), which reflects the access point having been selected. An instance of VG pattern 240 is located at the access point corresponding to the intersection of M0 pin pattern 220I(1) and track 205V(4), which reflects the access point having been selected. An instance of VG pattern 240 is located at the access point corresponding to the intersection of M0 pin pattern 220I(2) and track 205V(8), which reflects the access point having been selected. An instance of VG pattern 240 is located at the access point corresponding to the intersection of M0 pin pattern 222I(1) and track 205V(6), which reflects the access point having been selected.

Figure 6F:
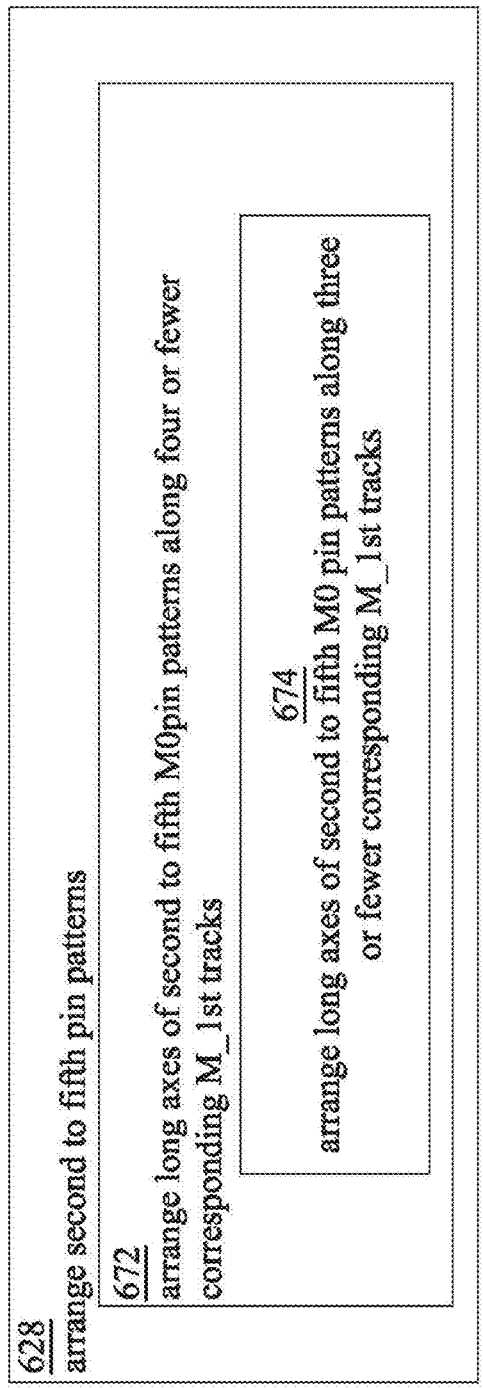

FIG. 6F is a flowchart of a method of generating a layout diagram, in accordance with some embodiments.

More particularly, the method of FIG. 6F shows block 626 of FIG. 6A in more detail, in accordance with one or more embodiments.

In FIG. 6F, block 626 includes block 672. At block 672, long axes of the second to fifth M0 pin patterns are arranged along four or fewer corresponding ones of the M*1st tracks. Examples of arrangements of the second to fourth M0 pin patterns along four or fewer ones of the M0 tracks include the arrangements in cells 206E-206H of corresponding FIGS. 2E-2H.

Block 672 includes block 674. At block 674, long axes of the second to fifth M0 pin patterns are arranged along four or fewer corresponding ones of the M*1st tracks. Examples of arrangements of the second to fourth M0 pin patterns along three or fewer ones of the M0 tracks include the arrangements in cells 206A-206D and 206I(3) of corresponding FIGS. 2A-2D and 2I(3).

Figure 6G:
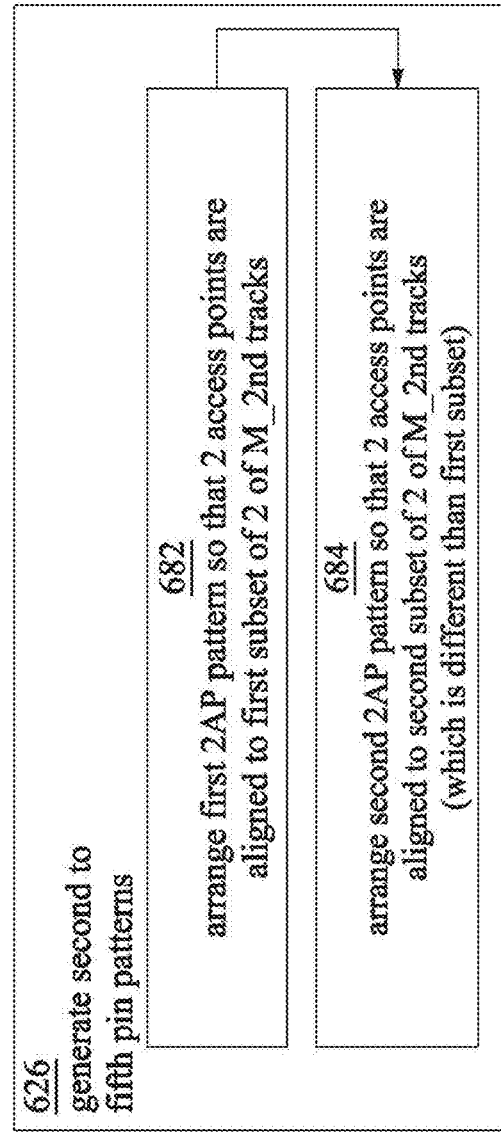

FIG. 6G is a flowchart of a method of generating a layout diagram, in accordance with some embodiments.

More particularly, the method of FIG. 6G shows block 626 of FIG. 6A in more detail, in accordance with one or more embodiments.

In FIG. 6G, block 626 includes blocks 682-684. At block 682, a first 2AP pattern among the second to fifth M0 pin patterns is arranged so that the two access points of the first 2AP are aligned substantially to a first subset of two of the M*2nd tracks. An example of a first one of the second to fifth M0 pin patterns being a 2AP pattern is pin pattern 218B(2) of FIG. 2B, whose two access points are substantially aligned with corresponding M1 tracks 205V(6) and 205V(7). From block 682, flow proceeds to block 684.

At block 684, a second 2AP pattern among the second to fifth M0 pin patterns is arranged so that the two access points of the second 2AP are aligned substantially to a second subset of two of the M*2nd tracks, where the second subset is different than the first subset. An example of a second one of the second to fifth M0 pin patterns being a 2AP pattern is pin pattern 220B(1) of FIG. 2B, whose two access points are substantially aligned with corresponding M1 tracks 205V(2) and 205V(3). Again, a benefit of the arrangement of M0 pin patterns according to one or more embodiments, e.g., the arrangement in FIG. 2B, is that the arrangement avoids the 'stacked 2AP pattern' circumstance (discussed above), and thereby prevents the stacked 2AP pattern problem (discussed above).

FIG. 7 is a block diagram of an electronic design automation (EDA) EDA system 700 in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, where computer program code 706 is a set of computer-executable instructions. Execution of computer program code 706 by processor 702 represents (at least in part) an EDA tool which implements a portion or all of, e.g., the methods described herein in accordance with one or more corresponding embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause EDA system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

Figure 8:
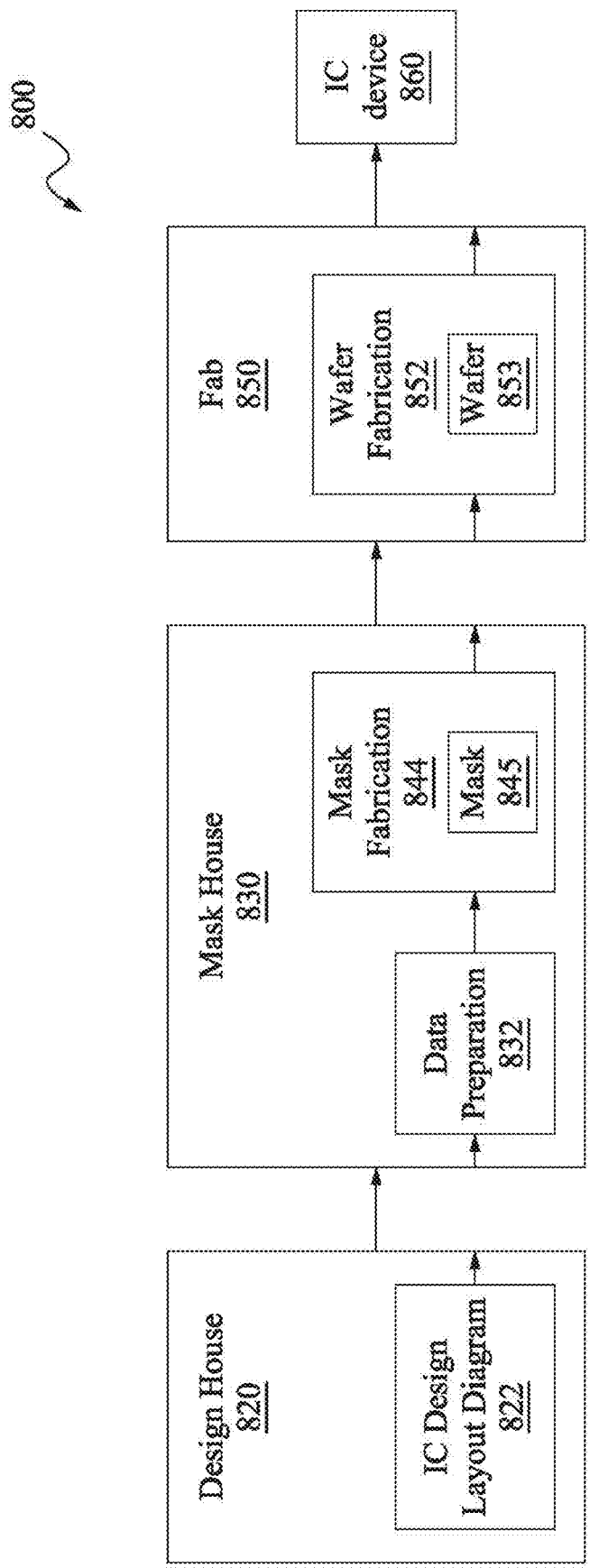
FIG. 8 is a block diagram of a semiconductor device manufacturing system, and an IC manufacturing flow associated therewith, in accordance with some embodiments.

In one or more embodiments, storage medium 704 stores computer program code 706 configured to cause EDA system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells corresponding to cells disclosed herein. In one or more embodiments, storage medium 704 stores one or more layout diagrams 709 corresponding to one or more layouts disclosed herein, e.g., IC design layout diagram 822 (FIG. 8).

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

FIG. 8 is a block diagram of semiconductor device, e.g., an integrated circuit (IC), manufacturing system 800, and an IC manufacturing flow associated therewith, in accordance with some embodiments.

In some embodiments, based on a layout diagram, e.g., one or more of the layout diagrams disclosed herein in accordance with one or more corresponding embodiments, or the like, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference. It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

In some embodiments, a semiconductor device includes: a transistor layer that overlays a substrate layer; M*1st conductors extending in a first direction, being in a first layer of metallization (M*1st layer) that overlays the transistor layer and being aligned correspondingly along alpha tracks, the M*1st conductors including first and second input pins aligned to different corresponding ones of the alpha tracks and representing corresponding inputs of a cell region, the cell region representing at least part of a circuit in the semiconductor device; and M*2nd conductors extending in a second direction perpendicular to the first direction, being in a second layer of metallization (M*2nd layer) that overlays the M*1st layer and being aligned correspondingly along beta tracks, and the M*2nd conductors including at least one power grid (PG) segment and one or more of an output pin or a routing segment; and each of the first and second input pins having a length in the first direction sufficient to accommodate at most two access points; each of the access points of the first and second input pins being aligned to a corresponding different one of first, second, third and fourth ones of beta tracks (first to fourth beta tracks); and the PG segment being aligned with one of the first to fourth beta tracks.

In some embodiments, two of the first to fourth input pins are substantially co-track aligned.

In some embodiments, long axes of the first to fourth input pins in the M*1st layer are substantially aligned along three or fewer corresponding ones of M*1st tracks.

In some embodiments, long axes of the first and second input pins in the M*1st layer are substantially aligned along two or fewer corresponding ones of M*1st tracks.

In some embodiments, the long axes of the first and second input pins in the M*1st layer are substantially aligned with different corresponding ones of M*1st tracks.

In some embodiments, the M*1st conductors further include a third input pin which is co-track aligned with the first or second input pin; and the third input pin has a length, in the first direction sufficient to accommodate at least three access points.

In some embodiments, the access points of the first input pin are aligned correspondingly to the first and second beta tracks; the access points of the second input pin are aligned correspondingly to the third and fourth beta tracks; and relative to the first direction, at least one a fifth one of the beta tracks (fifth beta track) is between (1) the first and second beta tracks and (2) the third and fourth beta tracks.

In some embodiments, relative to the first direction, at least the fifth beta track and a sixth one of the beta tracks is between (1) the first and second beta tracks and (2) the third and fourth beta tracks.

In some embodiments, a semiconductor device includes: a transistor layer that overlays a substrate layer; M*1st conductors extending in a first direction, being in a first layer of metallization (M*1st layer) that overlays the transistor layer and being aligned along alpha tracks, the M*1st conductors including first and second input pins aligned to different corresponding ones of the alpha tracks and representing corresponding inputs of a cell region, the cell region representing at least part of a circuit in the semiconductor device; each of the first and second input pins having a length in the first direction sufficient to accommodate at most two access points, the access points being aligned to corresponding ones of beta tracks that extend in a second direction perpendicular to the first direction; and M*2nd conductors extending in the second direction, being in a second layer of metallization (M*2nd layer) that overlays the M*1st layer and being aligned correspondingly along the beta tracks, and the M*2nd conductors including routing segments and at least one power grid (PG) segment; the PG segment being aligned with one of the beta tracks of the access points of the first input pin or one of the beta tracks of the access points of the second input pin; and the beta tracks to which are aligned the access points of the first input pin being different than the beta tracks to which are aligned the access points of the second input pin.

In some embodiments, two of the first to fourth input pins are substantially co-track aligned.

In some embodiments, long axes of the first to fourth input pins in the M*1st layer are substantially aligned along three or fewer corresponding ones of M*1st tracks.

In some embodiments, long axes of the first and second input pins in the M*1st layer are substantially aligned along two or fewer corresponding ones of M*1st tracks.

In some embodiments, the long axes of the first and second input pins in the M*1st layer are substantially aligned with different corresponding ones of M*1st tracks.

In some embodiments, the M*1st conductors further include a third input pin which is co-track aligned with the first or second input pin; and the third input pin has a length, in the first direction sufficient to accommodate at least three access points.

In some embodiments, the access points of the first input pin are aligned correspondingly to first and second ones of the beta tracks (first and second beta tracks); the access points of the second input pin are aligned correspondingly to third and fourth ones of the beta tracks (third and fourth beta tracks); and relative to the first direction, at least one a fifth one of the beta tracks (fifth beta track) is between (1) the first and second beta tracks and (2) the third and fourth beta tracks.

In some embodiments, relative to the first direction, at least the fifth beta track and a sixth one of the beta tracks is between (1) the first and second beta tracks and (2) the third and fourth beta tracks.

In some embodiments, a method (manufacturing a semiconductor device) includes: forming a transistor layer that overlays a substrate layer; forming a first layer of metallization that overlays the transistor layer, the forming a first layer of metallization (M*1st layer) including: forming a set of first conductors each of which extends in a first direction and is aligned along a corresponding one alpha tracks, the set of first conductors representing corresponding input pins of a cell region including first and second input puts, the cell region representing at least part of a circuit in the semiconductor device; and relative to the first direction, cutting lengths of each of the first and second input pins sufficient to accommodate at most two access points, each of the access points of the first and second input pins being aligned to a corresponding different one of first, second, third and fourth ones of beta tracks (first to fourth beta tracks) that extend in a second direction; and the beta tracks to which are aligned the access points of the first input pin being different than the beta tracks to which are aligned the access points of the second input pin; and forming second layer of metallization (M*2nd layer) to overlay the M*1st layer, the forming the M*2nd layer including: forming a second set of one or more second conductors so that each of the one or more second conductors extends in a second direction substantially perpendicular to the first direction, the one or more second conductors representing routing segments and at least one power grid (PG) segment; and locating the PG segment to align with one of the beta tracks of the access points of the first input pin or one of the beta tracks of the access points of the second input pin.

In some embodiments, the forming a set of first conductors includes: substantially aligning long axes of the first and second input pins in the M*1st layer along two or fewer corresponding ones of M*1st tracks.

In some embodiments, the forming a set of first conductors further includes: substantially aligning the long axes of the first and second input pins in the M*1st layer with different corresponding ones of M*1st tracks.

In some embodiments, the M*1st conductors further include a third input pin; and the forming a set of first conductors includes: co-track aligning the third input pin with the first or second input pin; and relative to the first direction, cutting a length of the third input pin sufficient to accommodate at least three access points.

In some embodiments, the forming a set of first conductors includes: aligning the access points of the first input pin correspondingly to the first and second beta tracks; aligning the access points of the second input pin correspondingly to the third and fourth beta tracks; and relative to the first direction, spacing apart the first input pin and the second input pin so that at least one a fifth one of the beta tracks (fifth beta track) is between (1) the first and second beta tracks and (2) the third and fourth beta tracks.

In some embodiments, the forming a set of first conductors includes: relative to the first direction, spacing apart the first input pin and the second input pin so that at least the fifth beta track and a sixth one of the beta tracks is between (1) the first and second beta tracks and (2) the third and fourth beta tracks.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
a transistor layer that overlays a substrate layer;
M*1st conductors extending in a first direction, being in a first layer of metallization (M*1st layer) that overlays the transistor layer and being aligned correspondingly along alpha tracks,
  the M*1st conductors including first and second input pins aligned to different corresponding ones of the alpha tracks and representing corresponding inputs of a cell region, the cell region representing at least part of a circuit in the semiconductor device; and
M*2nd conductors extending in a second direction perpendicular to the first direction, being in a second layer of metallization (M*2nd layer) that overlays the M*1st layer and being aligned correspondingly along beta tracks, and the M*2nd conductors including at least one power grid (PG) segment and one or more of an output pin or a routing segment; and
each of the first and second input pins having a length in the first direction sufficient to accommodate at most two access points;
each of the access points of the first and second input pins being aligned to a corresponding different one of first, second, third and fourth ones of beta tracks (first to fourth beta tracks); and
the PG segment being aligned with one of the first to fourth beta tracks.

2. The semiconductor device of claim 1, wherein:
the M*1st conductors further include third and fourth input pins; and
two of the first to fourth input pins are substantially co-track aligned.

3. The semiconductor device of claim 1, wherein:
the M*1st conductors further include third and fourth input pins; and
long axes of the first to fourth input pins in the M*1st layer are substantially aligned along three or fewer corresponding ones of M*1st tracks.

4. The semiconductor device of claim 1, wherein:
long axes of the first and second input pins in the M*1st layer are substantially aligned along two or fewer corresponding ones of M*1st tracks.

5. The semiconductor device of claim 4, wherein:
the long axes of the first and second input pins in the M*1st layer are substantially aligned with different corresponding ones of M*1st tracks.

6. The semiconductor device of claim 1, wherein:
the M*1st conductors further include a third input pin which is co-track aligned with the first or second input pin; and
the third input pin has a length, in the first direction sufficient to accommodate at least three access points.

7. The semiconductor device of claim 1, wherein:
the access points of the first input pin are aligned correspondingly to the first and second beta tracks;
the access points of the second input pin are aligned correspondingly to the third and fourth beta tracks; and
relative to the first direction, at least a fifth one of the beta tracks (fifth beta track) is between (1) the first and second beta tracks and (2) the third and fourth beta tracks.

8. The semiconductor device of claim 7, wherein:
relative to the first direction, at least the fifth beta track and a sixth one of the beta tracks is between (1) the first and second beta tracks and (2) the third and fourth beta tracks.

9. A semiconductor device comprising:
a transistor layer that overlays a substrate layer;
M*1st conductors extending in a first direction, being in a first layer of metallization (M*1st layer) that overlays the transistor layer and being aligned along alpha tracks,
the M*1st conductors including first and second input pins aligned to different corresponding ones of the alpha tracks and representing corresponding inputs of a cell region, the cell region representing at least part of a circuit in the semiconductor device;
each of the first and second input pins having a length in the first direction sufficient to accommodate at most two access points, the access points being aligned to corresponding ones of beta tracks that extend in a second direction perpendicular to the first direction; and
M*2nd conductors extending in the second direction, being in a second layer of metallization (M*2nd layer) that overlays the M*1st layer and being aligned correspondingly along the beta tracks, and the M*2nd conductors including routing segments and at least one power grid (PG) segment;
the PG segment being aligned with one of the beta tracks of the access points of the first input pin or one of the beta tracks of the access points of the second input pin; and
the beta tracks to which are aligned the access points of the first input pin being different than the beta tracks to which are aligned the access points of the second input pin.

10. The semiconductor device of claim 9, wherein:
the M*1st conductors further include third and fourth input pins; and
two of the first to fourth input pins are substantially co-track aligned.

11. The semiconductor device of claim 9, wherein:
the M*1st conductors further include third and fourth input pins; and
long axes of the first to fourth input pins in the M*1st layer are substantially aligned along three or fewer corresponding ones of M*1st tracks.

12. The semiconductor device of claim 9, wherein:
long axes of the first and second input pins in the M*1st layer are substantially aligned along two or fewer corresponding ones of M*1st tracks.

13. The semiconductor device of claim 12, wherein:
the long axes of the first and second input pins in the M*1st layer are substantially aligned with different corresponding ones of M*1st tracks.

14. The semiconductor device of claim 9, wherein:
the M*1st conductors further include a third input pin which is co-track aligned with the first or second input pin; and
the third input pin has a length, in the first direction sufficient to accommodate at least three access points.

15. The semiconductor device of claim 9, wherein:
the access points of the first input pin are aligned correspondingly to first and second ones of the beta tracks (first and second beta tracks);
the access points of the second input pin are aligned correspondingly to third and fourth ones of the beta tracks (third and fourth beta tracks); and
relative to the first direction, at least a fifth one of the beta tracks (fifth beta track) is between (1) the first and second beta tracks and (2) the third and fourth beta tracks.

16. The semiconductor device of claim 15, wherein:
relative to the first direction, at least the fifth beta track and a sixth one of the beta tracks is between (1) the first and second beta tracks and (2) the third and fourth beta tracks.

17. A semiconductor device comprising:
a transistor layer that overlays a substrate layer;
a first layer of metallization (M*1st layer) that overlays the transistor layer, wherein the M*1st layer includes at least first, second, third and fourth input pins, the at least first, second, third and fourth input pins representing corresponding inputs of a circuit; and
a second layer of metallization (M*2nd layer) that overlays the M*1st layer, wherein the M*2nd layer includes at least a first output pin, the at least first output pin representing a first output of the circuit and at least partially overlapping the first input pin;
wherein, relative to a total number of pins in the M*1st and M*2nd layers, a majority of the total number of pins is in the M*1st layer.

18. The semiconductor device of claim 17, wherein:
two of the first to fourth input pins are substantially co-track aligned.

19. The semiconductor device of claim 17, wherein:
the third input pin is co-track aligned with the first or second input pin.

20. The semiconductor device of claim 17, wherein:
the first, second, third and fourth input pins extend in a first direction; and
the first output pin extends in a second direction substantially perpendicular to the first direction.

* * * * *